United States Patent
Falconetti et al.

(10) Patent No.: US 10,548,143 B2
(45) Date of Patent: Jan. 28, 2020

(54) METHODS, APPARATUSES, AND SYSTEMS FOR INTERFERENCE-DEPENDENT CROSS-CARRIER SCHEDULING FOR LICENSE ASSISTED ACCESS UPLINK

(71) Applicant: TELEFONAKTIEBOLAGET LM ERICSSON (PUBL), Stockholm (SE)

(72) Inventors: Laetitia Falconetti, Järfälla (SE); Jung-Fu Cheng, Fremont, CA (US); Du Ho Kang, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 15/761,785

(22) PCT Filed: Sep. 6, 2016

(86) PCT No.: PCT/SE2016/050833
§ 371 (c)(1),
(2) Date: Mar. 20, 2018

(87) PCT Pub. No.: WO2017/052444
PCT Pub. Date: Mar. 30, 2017

(65) Prior Publication Data
US 2018/0270834 A1    Sep. 20, 2018

Related U.S. Application Data

(60) Provisional application No. 62/222,903, filed on Sep. 24, 2015.

(51) Int. Cl.
*H04W 72/08* (2009.01)
*H04W 72/12* (2009.01)
(Continued)

(52) U.S. Cl.
CPC ........ *H04W 72/082* (2013.01); *H04B 17/345* (2015.01); *H04W 72/1231* (2013.01);
(Continued)

(58) Field of Classification Search
None
See application file for complete search history.

(56) References Cited

U.S. PATENT DOCUMENTS

| 6,204,797 B1* | 3/2001 | Wicks | G01S 7/2813 342/13 |
| 2004/0022217 A1* | 2/2004 | Korpela | H04W 36/0085 370/335 |

(Continued)

OTHER PUBLICATIONS

Huawei et al: "Supported Functionalities and Parameters for LAA Cell", 3GPP Draft; R2-153313, vol. RAN WG2, No. Beijing, China; Aug. 24, 2015-Aug. 28, 2015, Aug. 23, 2015 (Aug. 23, 2015), XP051004059.

(Continued)

*Primary Examiner* — Bunjob Jaroenchonwanit
(74) *Attorney, Agent, or Firm* — Sage Patent Group

(57) ABSTRACT

A base station that monitors one or more channel conditions of an unlicensed carrier to detect whether there is an interfering signal in the unlicensed carrier. The base station may detect an interfering signal that, for instance, is hidden from and difficult to detect by a WCD that has UL data to send. If the base station detects an interfering signal on the unlicensed carrier, it proceeds with transmitting a UL grant message to the WCD, however, the base station may configure the transmission of the UL grant message to the WCD based on the interfering signal. For instance, the base station may determine, based on the interfering signal, when to transmit the UL grant message, or may determine, based on the interfering signal, UL transmission parameter values to (Continued)

include in the UL grant message, or any combination thereof.

18 Claims, 15 Drawing Sheets

(51) Int. Cl.
*H04B 17/345* (2015.01)
*H04W 16/14* (2009.01)
*H04W 72/04* (2009.01)

(52) U.S. Cl.
CPC ........ *H04W 16/14* (2013.01); *H04W 72/0473* (2013.01); *H04W 72/1284* (2013.01)

(56) References Cited

U.S. PATENT DOCUMENTS

| | | | |
|---|---|---|---|
| 2013/0064214 A1* | 3/2013 | Patil | H04L 1/0002 370/330 |
| 2015/0223244 A1 | 8/2015 | Tabet et al. | |
| 2016/0302225 A1* | 10/2016 | Damnjanovic | H04W 72/1284 |
| 2016/0373175 A1* | 12/2016 | Harrison | H04B 7/0469 |
| 2017/0141903 A1* | 5/2017 | Xu | H04L 1/0005 |
| 2017/0230997 A1* | 8/2017 | Damnjanovic | H04L 5/005 |
| 2017/0244434 A1* | 8/2017 | Sesia | H04J 11/005 |
| 2018/0235000 A1* | 8/2018 | Damnjanovic | H04W 72/1284 |

OTHER PUBLICATIONS

Panasonic: "Self-Scheduling and Cross-Scheduling Options for Unlicensed Carrier Access", vol. RAN WG1, No. Beijing, China; Aug. 24, 2015-Aug. 28, 2015, Aug. 23, 2015 (Aug. 23, 2015), XP051039374.

Extended European Search Report and Search Opinion—16849102.5—dated Apr. 29, 2019—11 pages.

International Search Report and Written Opinion issued in International Application No. PCT/SE2016/050833, dated Nov. 9, 2016, 10 pages.

3GPP Tsg-RAN WG1 Meeting #80bis, R1-151972, "Design of LAA-WiFi Hidden Terminal Mitigation", Institute for Information Industry (III), Belgrade, Serbia Apr. 20-24, 2015, 6 pages.

3GPP TSG-RAN1 #80, R1-150369, "Discussion on LAA Hidden Node Issue", Samsung, Athens, Greece, Feb. 9-Feb. 13, 2015, 5 pages.

3GPP TSG-RAN WG2 #89bis, R2-151302, "On Licensed-Assisted Access Uplink Issues", ITRI, Bratislava, Slovakia, Apr. 20-Apr. 24, 2015, 3 pages.

3GPP TSG RAN WG1 Meeting #82, R1-154083, "LBT for cross-carrier UL scheduling", Intel Corporation, Beijing, China, Aug. 24-28, 2015, 4 pages.

3GPP TSG RAN WG1 Meeting #82, R1-154080, "LBT design and performance evalation for LAA UL", Intel Corporation, Beijing, China, Aug. 24-28, 2015, 5 pages.

* cited by examiner

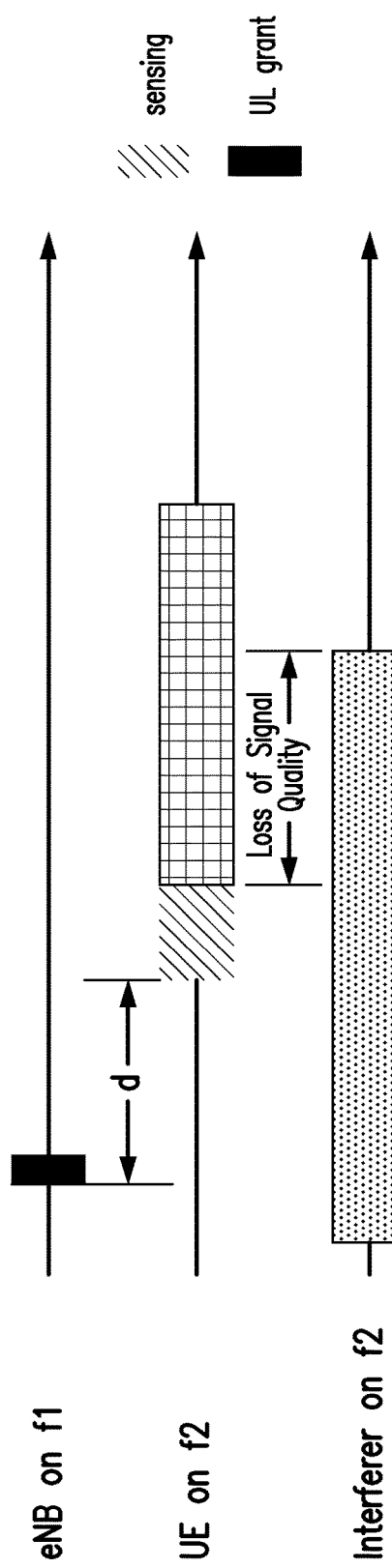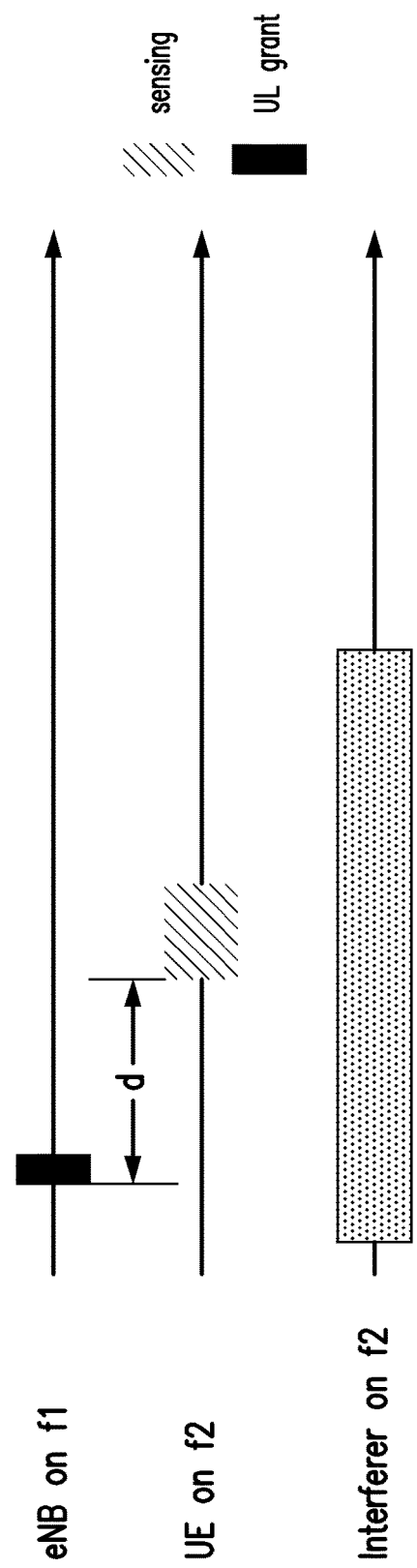

METHODS, APPARATUSES, AND SYSTEMS FOR INTERFERENCE-DEPENDENT CROSS-CARRIER SCHEDULING FOR LICENSE ASSISTED ACCESS UPLINK

CROSS REFERENCE TO RELATED APPLICATION(S)

This application is a 35 U.S.C. § 371 National Stage of International Patent Application No. PCT/SE2016/050833, filed Sep. 6, 2016, designating the United States and claiming priority to U.S. provisional application No. 62/222,903, filed on Sep. 24, 2015. The above identified applications are incorporated by reference.

TECHNICAL FIELD

This disclosure relates to methods, apparatuses, and systems for interference-dependent cross-carrier scheduling for license assisted access uplink.

BACKGROUND

Telecommunications systems such as UMTS and LTE can use licensed carrier spectrum (e.g., the 700 MHz spectrum) for communicating with user equipments (UEs). The 3GPP initiative and others have discussed the use of unlicensed carrier spectrum (e.g. the 5 GHz spectrum) for LTE, through a technology referred to as "License Assisted Access" (LAA) or "LTE in unlicensed spectrum" (LTE-U). LAA intends to allow LTE equipment to operate in both a licensed carrier spectrum ("licensed carrier") and an unlicensed carrier spectrum ("unlicensed carrier").

The unlicensed carrier can be used as a complement to the licensed carrier. The licensed carrier can be used to establish a primary cell (PCell), and the unlicensed carrier can be used as a secondary cell (SCell). Devices connect in the licensed carrier (in the PCell) and use carrier aggregation to benefit from additional transmission capacity in the unlicensed carrier (in the SCell). LTE allocates different time periods, called subframes, for the transmission of different units of data in the licensed carrier, and the same subframe timing in the licensed carrier can be used for transmission in the unlicensed carrier.

The unlicensed, 5 GHz carrier is used by equipment implementing the IEEE 802.11 Wireless Local Area Network (WLAN) standard. This standard is known under its marketing brand "Wi-Fi." To coexist with the Wi-Fi system, a transmission by a LTE device on the SCell may need to conform to a "Listen Before Talking" (LBT) protocol to avoid collisions and causing severe interference to on-going transmissions, by performing channel sensing before attempting to transmit on the SCell. Different regions may limit the maximum duration of a transmission burst in the unlicensed carrier.

LTE transmission by a UE in the unlicensed carrier may be scheduled by a scheduling node, such as a eNB serving the UE. The scheduling may use self-scheduling or cross-carrier scheduling. In case of self-scheduling, an eNB first starts the LBT operation and measures the interference level in the unlicensed carrier to determine if the carrier is free or occupied. If the LBT procedure indicates the unlicensed carrier is free, the eNB transmits, via the unlicensed carrier and to the UE, control signaling containing a UL grant message, which grants the UE a UL subframe in the unlicensed carrier that starts after a delay period d; otherwise the eNB refrains from sending the grant to the UE. Because of the LBT operation, the transmission of the UL grant message may be delayed by the amount of time that is needed for the eNB to carry out the LBT operation.

In case of cross-carrier scheduling, the eNB transmits, to the UE, the UL grant message over the licensed carrier. The UL grant message that is transmitted over the licensed carrier grants to the UE a UL subframe in the unlicensed carrier that begins after a delay d. Because the UL grant message is transmitted over the licensed carrier, the eNB does not perform any LBT operation before transmitting scheduling signals over the licensed carrier.

SUMMARY

The present application relates to determining when to transmit an UL grant message and/or to determine UL transmission parameter values to include in an UL grant message. These determinations may be performed as part of cross-carrier scheduling for licensed assist access (LAA) uplink.

Cross-carrier scheduling provides an advantage over self-scheduling by having a base station (e.g., eNB) omit listen-before-talking (LBT) operations, thus ensuring greater certainty that the base station will transmit a UL grant message for an unlicensed carrier to a wireless communication device (WCD) (e.g., a UE). This scheme may rely on the WCD to perform a LBT operation on the unlicensed carrier as a way to avoid collision with an interfering signal being transmitted on the unlicensed carrier at the same time. This scheme, however, has drawbacks. First, the WCD may fail to sense the transmission of an interfering signal from a device which is in the neighborhood of the base station, but which may appear hidden to the WCD. This hidden interfering device may cause a lot of degradation in the reception of useful signals at the base station. This may lead to reduced user performance. Second, even if the WCD does sense an interfering signal on the unlicensed carrier and refrains from or aborts a UL transmission scheduled by the UL grant message, this still wastes a scheduled subframe, which can reduce system capacity.

The present application thus relates to a base station which monitors one or more channel conditions of the unlicensed carrier to detect whether there is an interfering signal in the unlicensed carrier. The base station may detect an interfering signal that, for instance, is hidden from and difficult to detect by the WCD. The interference detection may rely solely on the base station, or may rely on assistance from the WCD. If the base station detects an interfering signal on the unlicensed carrier, it may still proceed with transmitting a UL grant message. However, the base station may configure the transmission of the UL grant message based on the interfering signal. For instance, the base station may determine, based on the interfering signal, when to transmit the UL grant message, or may determine, based on the interfering signal, UL transmission parameter values to include in the UL grant message, or any combination thereof. Configuring the transmission of the UL grant message may cause the subsequent, corresponding UL transmission to avoid an interfering signal on the unlicensed carrier, to better cope with the interfering signal, or any combination thereof.

The present application thus relates to a method performed by a base station for scheduling an uplink (UL) transmission from a wireless communication device (WCD), where the base station and the WCD are operable to communicate using a first carrier (c1) (e.g., a carrier, such as a licensed carrier, which is accessed based on grants from a base station or other scheduling unit) at a first frequency (f1) and a second carrier (c2) (e.g., a carrier, such as an unlicensed carrier, which is accessed based on a contention or collision avoidance scheme).

More specifically, the base station may first determine that the WCD should be granted permission to transmit the UL transmission on the second carrier. The base station also detects at the second frequency (f2) an interfering signal that would interfere with the UL transmission on the second carrier by the WCD. In response to detecting the interfering signal, the base station transmits on the first carrier an UL grant message to the WCD, wherein the transmission of the UL grant message is based on the detected interfering signal.

In some cases, the step of transmitting the UL grant message based on the detected interfering signal comprises: the base station determining a duration estimate for estimating the duration of the interfering signal; the base station determining, based on the duration estimate, a point in time at which the base station will transmit to the WCD the UL grant message; and the base station transmitting the UL grant message at said determined point in time.

In some cases, the step of transmitting the UL grant message based on the detected interfering signal further comprises the base station determining whether a power level of the interfering signal is less than a threshold, $I_0$. In some cases, the threshold is equal to a threshold used by the WCD for clear channel assessment energy detection, CCA-ED.

In some cases, the base station further performs the following steps as a result of determining that the power level is not less than $I_0$: determining a duration estimate for estimating the duration of the interfering signal; determining, based on the duration estimate, a point in time at which the base station will transmit to the WCD the UL grant message; and transmitting the UL grant message at said determined point in time.

In some cases, the method also includes the base station determining a power level of the detected interfering signal; and the base station determining, based on the power level of the detected interfering signal, transmission parameter values for the UL transmission, wherein the determined transmission parameter values are included in the transmitted UL grant message. In some cases, the transmission parameter values identify at least one of the following that the WCD is to use for UL transmission in the second carrier frequency channel: a modulation or coding scheme, a transmission power level, a rank of multi-antenna transmission, a coefficient for multi-antenna transmissions, and a parameter value for the WCD to use in performing collision avoidance in the second carrier frequency channel. In some cases, determining the transmission parameter values based on the power level of the detected interfering signal comprises: determining whether the power level of the interfering signal is less than a threshold; and further comprises one of: the base station selecting a first set of transmission parameter values to include in the UL grant message in response to the base station determining that the power level of the interfering signal is less than the threshold; and the base station selecting a second set of transmission parameter values to include in the UL grant message in response to the base station determining that the power level of the interfering signal is not less than the threshold. In some cases, the base station adjusts the threshold based on an estimated signal to noise ratio, SINR, for the UL transmission, wherein the estimated SINR is estimated based on a current interference level in the second carrier (c2) and a power level that the WCD is expected to use for the UL transmission. In some cases, the base station increases the threshold in response to determining that the expected SINR supports a modulation or coding scheme that the WCD is expected to use for the UL transmission.

In some cases, determining the point in time comprises calculating one of: $(t_0+L-d)$ and $(t_0+L-d+f)$, wherein $t_0$ is an estimated start time of the detected interfering signal, L is the duration estimate, d is a predetermined delay, and f is a fractional period that remains before a next sub-frame begins.

In another aspect, apparatus is provided for scheduling an uplink, UL, transmission from a wireless communication device, WCD, wherein the WCD is operable to communicate using a first carrier at a first frequency (f1) and second carrier at a second frequency (f2). The apparatus is adapted to: determine that the WCD should be granted permission to transmit the UL transmission on the second carrier; detect at the second frequency (f2) an interfering signal that would interfere with the UL transmission on the second carrier by the WCD; and transmit on the first carrier an UL grant message to the WCD based on the detected interfering signal in response to detecting the interfering signal.

In some cases, the apparatus is adapted to transmit the UL grant message based on the detected interfering signal by: determining a duration estimate for estimating the duration of the interfering signal; determining, based on the duration estimate, a point in time at which the base station will transmit to the WCD the UL grant message; and transmitting the UL grant message at said determined point in time.

In some cases, the apparatus is adapted to transmit the UL grant message based on the detected interfering signal by determining whether a power level of the interfering signal is less than a threshold, $I_0$. In some cases, as a result of determining that the power level is not less than $I_0$ the following steps are performed by the apparatus: determining a duration estimate for estimating the duration of the interfering signal; determining, based on the duration estimate, a point in time at which the base station will transmit to the WCD the UL grant message; and transmitting the UL grant message at said determined point in time.

In some cases, the apparatus is further adapted to determine a power level of the detected interfering signal and determine, based on the power level of the detected interfering signal, transmission parameter values for the UL transmission, wherein the determined transmission parameter values are included in the transmitted UL grant message. In some cases the transmission parameter values identify at least one of the following that the WCD is to use for UL transmission in the second carrier frequency channel: a modulation or coding scheme, a transmission power level, a rank of multi-antenna transmission, a coefficient for multi-antenna transmissions, and a parameter value for the WCD to use in performing collision avoidance in the second carrier frequency channel. In some cases, the apparatus is adapted to determine the transmission parameter values based on the power level of the detected interfering signal by: determining whether the power level of the interfering signal is less than a threshold; and further performing one of: selecting a first set of transmission parameter values to include in the UL grant message in response to the base station determining that the power level of the interfering signal is less than the threshold; and selecting a second set of transmission parameter values to include in the UL grant message in response to the base station determining that the power level of the interfering signal is not less than the threshold. In some cases, the apparatus is further adapted to adjust the threshold based on an estimated signal to noise ratio, SINR, for the UL transmission, wherein the estimated SINR is estimated based on a current interference level in the second carrier and a power level that the WCD is expected to use for the UL transmission. In some cases, the apparatus is adapted to increase the threshold in response to determining that the expected SINR supports a modulation or coding scheme that the WCD is expected to use for the UL transmission.

In some cases, the apparatus is adapted to determine the point in time by calculating one of: $(t_0+L-d)$ and $(t_0+L-d+f)$, wherein $t_0$ is an estimated start time of the detected interfering signal, L is the duration estimate, d is a predetermined delay, and f is a fractional period that remains before a next sub-frame begins.

In another embodiment, the apparatus includes means for determining that the WCD should be granted permission to transmit the UL transmission on the second carrier; means for detecting at the second frequency (f2) an interfering signal that would interfere with the UL transmission on the second carrier by the WCD; and means for transmitting on the first carrier an UL grant message to the WCD based on the detected interfering signal.

In other aspect, a computer program is provided for scheduling an uplink, UL, transmission from a wireless communication device, WCD, wherein the WCD is operable to communicate using a first carrier at a first frequency (f1) and second carrier at a second frequency (f2). The computer program includes instructions that, when executed on at least one processor, cause the at least one processor to carry out any one of the scheduling methods described herein.

BRIEF DESCRIPTION OF THE DRAWINGS

FIGS. 4A-4B illustrates the effect of interference in an unlicensed carrier on UL transmission.

DETAILED DESCRIPTION

The present disclosure relates to a system in which a base station that can communicate with a WCD on a first carrier (e.g., a licensed carrier) and a second carrier (e.g., an unlicensed carrier) monitors a channel condition of the second carrier to detect an interfering signal on the second carrier, and configures the transmission of a UL grant message based on the detected interfering signal. For instance, the base station may determine a timing of the transmission of the UL grant message based on the interfering signal, may determine UL transmission parameter values to include in the UL grant message based on the interfering signal, or any combination thereof.

Figure 1:
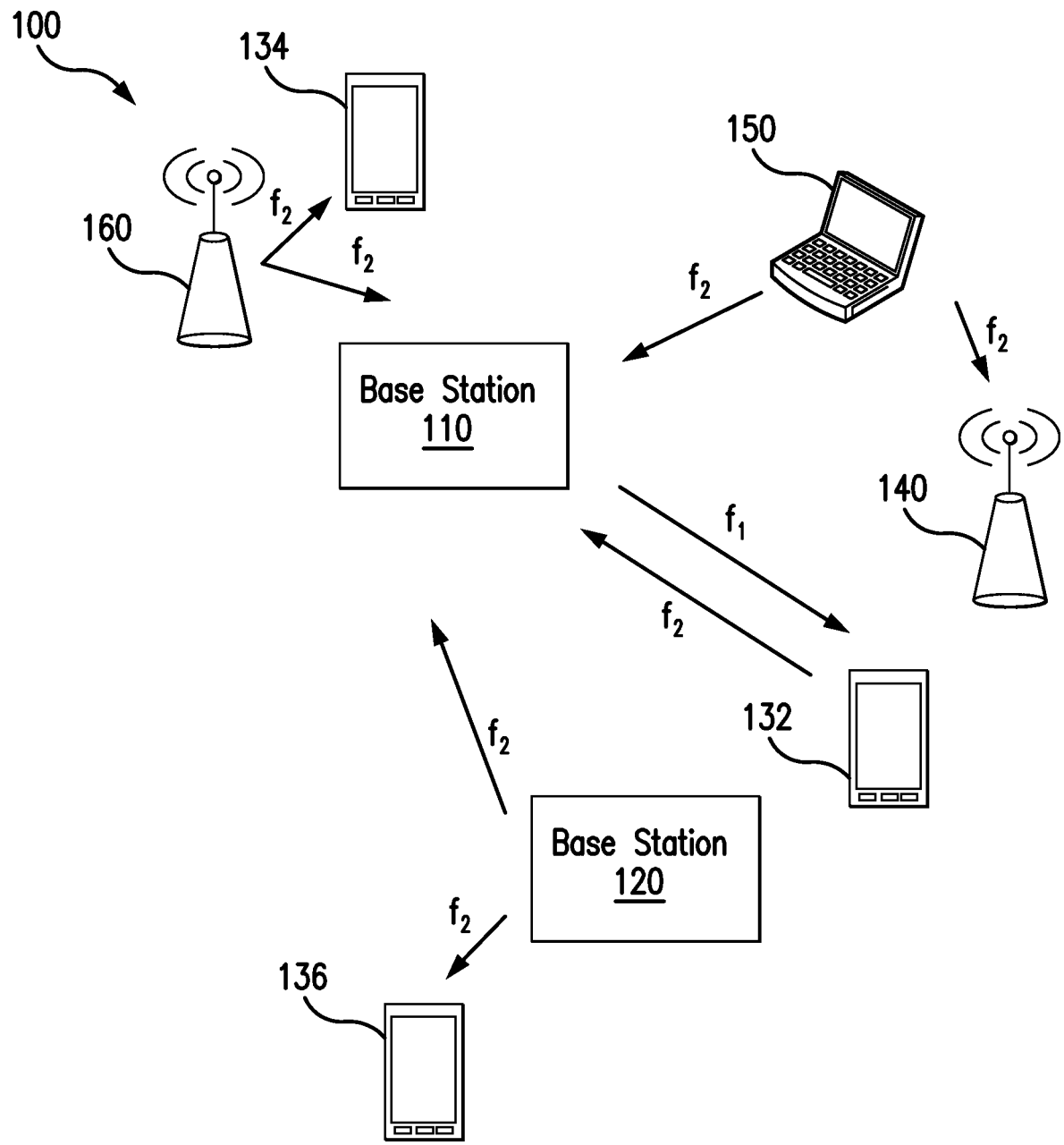
FIGS. 1 and 2 illustrate an example system for performing UL scheduling and for communicating on a first carrier at a first frequency and a second carrier at a second frequency.

FIG. 1 illustrates an example system 100 for performing UL scheduling, such as cross-carrier scheduling for license assisted access (LAA) UL transmissions. The system 100 may include a base station 110 that performs scheduling for a wireless communication device (WCD) 132 (e.g., a user equipment (UE)). The base station 110 may be operable to communicate with WCDs on a first carrier c1 which is at a first frequency f1 and on a second carrier c2 which is at a second frequency f2. As an example, the first carrier c1 may be a 10 MHz band centered at a frequency f1 of 782 MHz in the 777-787 MHz range, and the second carrier c2 may be a 20 MHz band centered at a frequency f2 of 5.18 GHz. The first carrier c1 may be licensed to a particular telecommunications provider, such that the telecommunications provider can deploy a base station which controls access to the carrier by granting permission to devices to transmit on the first carrier. The second carrier c2 may be unlicensed, and devices may rely on a contention-based access scheme (e.g., request to send/clear to send) to access the second carrier. The first carrier c1 may be a primary cell (PCell) of a carrier aggregation (CA) scheme and the second carrier c2 may be a secondary cell (SCell) of the CA scheme. Channel access for a licensed carrier such as LTE, channel access for an unlicensed carrier, and carrier aggregation and described in more detail later in the disclosure.

As illustrated in FIG. 1, the second carrier c2 at the second frequency f2 may be used by other devices, such as a router 140 (e.g., an IEEE 802.11a/b/g/n router), a router 160, a WCD 134 and WCD 136 (e.g., UEs), a WCD 150 (e.g., a laptop), and a base station 120. While WCD 132 may be configured to wait for a UL grant message before attempting to make a UL transmission to base station 110 on either carrier c1 or carrier c2, the other devices 140, 160, 134, 136, 150, 120 can attempt to transmit on the second carrier c2 at the same time, without seeking permission from base station 110 or any other scheduling unit. Thus, communication between base station 110 and WCD 132 on the second carrier c2 may experience interference caused by other devices that are using the second carrier c2 at the same time. For instance, WCD 150 may broadcast on carrier c2 a signal intended for router 140, and/or router 160 may broadcast on carrier c2 a signal intended for WCD 134, and these signals may interfere with a UL transmission on carrier c2 from WCD 132 to base station 110 that is occurring at about the same time. In an embodiment, interference may come from another base station. For example, base station 120 may also be using LAA or LTE-U to broadcast a signal intended for WCD 136 on carrier c2, and this signal may also interfere with the UL transmission at base station 110.

Figure 2:
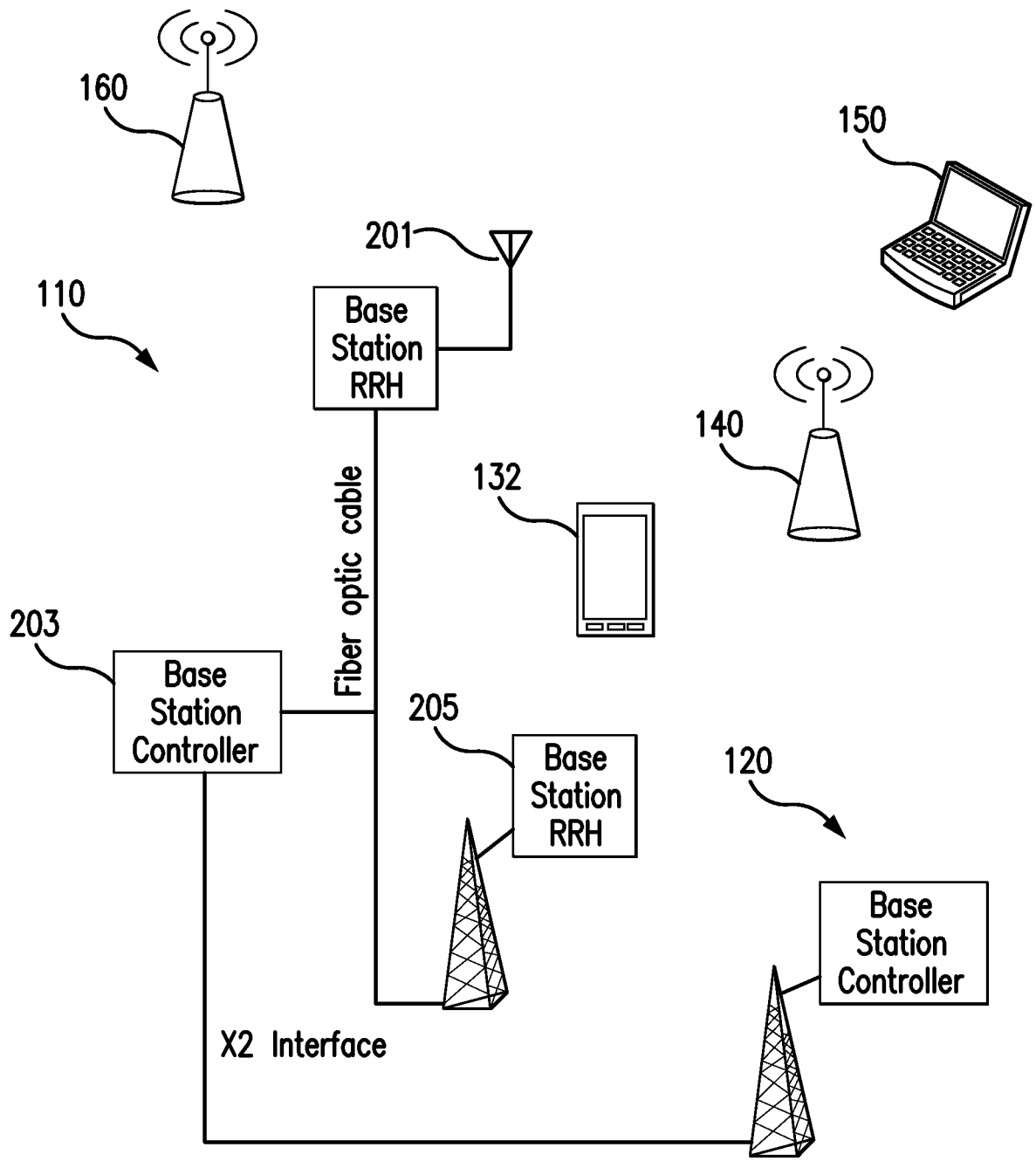

FIG. 2 illustrates a more detailed example of base station 110. More specifically, the base station may be a distributed base station that includes a first transceiver 201 and a second transceiver 205, which may be located at different locations. For instance, transceiver 201 may be located in an office or rooftop, while transceiver 205 may be located on a cell phone tower. Each transceiver may include a remote radio head (RRH), and the RRH may contain circuitry for processing received UL signals and for communicating with a base station controller 203, which may be at a remote location. Steps that are later described for transmitting a UL grant message may be performed in base station controller 203, in one or more of the transceivers 201, 203, or any combination thereof. The base station 110 may experience interference on carrier c2 in the form of interference at transceiver 201 or transceiver 205. In an embodiment, transceiver 205 may broadcast a signal on carrier c2 that interferes with the reception of UL transmission at transceiver 201, or vice versa.

Figure 3:
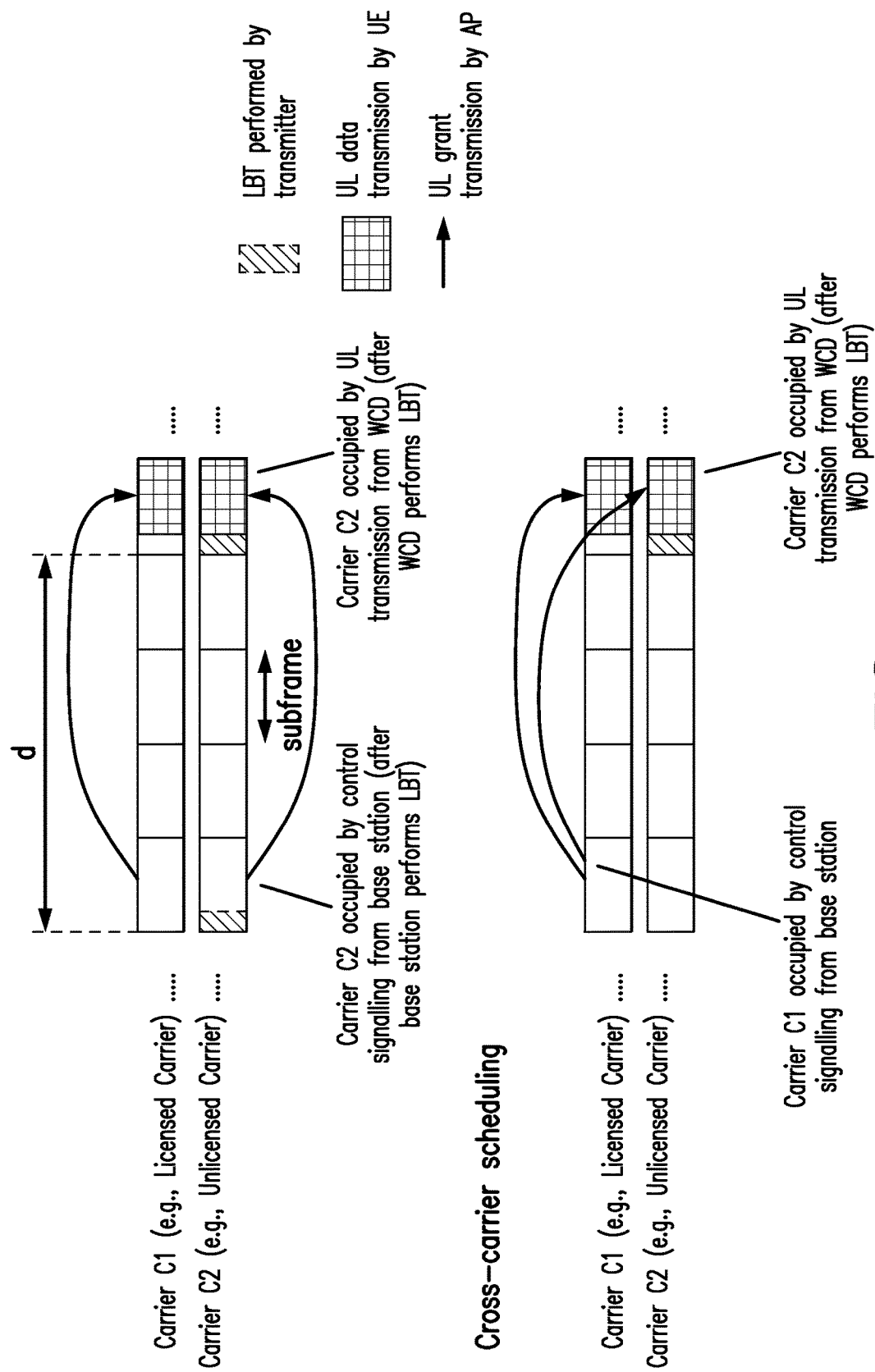
FIG. 3 illustrates self-scheduling and cross-carrier scheduling in a LAA system

As discussed above, one aspect of the present application relates to interference-dependent cross-carrier scheduling for licensed assisted access (LAA) uplink transmission. FIG. 3 illustrates an example of cross-carrier scheduling which may be independent of interference, along with an example of self-scheduling. In the case of self-scheduling, a UL grant message and the corresponding UL transmission are communicated on the same carrier. Thus, a UL grant message for accessing carrier c2 is also transmitted by the base station on carrier c2. In performing the self-scheduling on carrier c2, the base station first starts a Listen-Before-Talking (LBT) operation and measures an interference level on the carrier c2 for the purpose of detecting if the medium is free. If the LBT procedure succeeds (e.g., the carrier c2 is identified as free), the base station transmits on carrier c2 control signaling containing a UL grant message, which grants a UL subframe on carrier c2 that begins a delay period d after the transmission of the UL grant message. In the cross-carrier scheduling illustrated in FIG. 3, control signaling for scheduling carrier c2 (e.g., an unlicensed SCell) is transmitted over carrier c1 (e.g., a licensed PCell or another licensed SCell). The control signaling can include a UL grant message which grants a UL subframe on carrier c2 that begins a delay period d after the transmission of the UL grant message. Because carrier c1, over which the UL grant message is transmitted, may be a licensed carrier, the base station may elect to forego performing LBT before transmitting the UL grant message over carrier c1. Because the base station does not need to check whether carrier c2 is free or not, there is greater uncertainty whether the UL grant is transmitted or not. Thus, this form of cross-carrier scheduling provides the advantage greater certainty of access to the carrier for UL transmission, by not performing LBT.

The form of cross-carrier scheduling discussed above, however, can lead to problems from interference on the carrier c2, as illustrated in FIGS. 4A and 4B. In FIG. 4A, a UE or other WCD may receive a UL grant message and, after a delay period, perform interference sensing right before making a UL transmission. However, the WCD may fail to sense interference from an interferer in the neighborhood of the base station. For instance, WCD 132 may fail to detect a signal from router 160 that interferes or would interfere with UL signals at base station 110. This interfering device is hidden to the UE but will creating a lot of degradation in the reception of UL signals useful to the base station. This leads to reduced user performance. In FIG. 4B, the UE senses the interferer and is forced to abort UL data transmission. This means that the scheduled subframe will be wasted, which leads to reduced system capacity.

To avoid signal degradation and improve system capacity, the base station may thus monitor a channel condition of the second carrier c2 to detect if there is an interfering signal that would interfere with UL transmission from a WCD on the second carrier. Even if the base station detects an interfering signal, it may proceed with transmitting a UL grant message, but may configure a timing of the transmission and/or may configure UL transmission parameter values to include in the UL grant message based on the detected interfering signal.

In one example, the base station may time the transmission of the UL grant message so that the subsequent, corresponding UL transmission occurs after the interfering signal is expected to be stopped. For instance, the base station may detect that the interfering signal has a start time of $t_0$ and may determine a duration estimate L that estimates the duration of the interfering signal. If the interfering signal does not meet a predetermined condition (e.g., its power level is less than a predetermined threshold $I_0$), the base station may transmit the UL grant message as early as desired. If the interfering signal exceeds the predetermined condition, however, it may time the transmission of the UL grant message to cause a subsequent, corresponding UL transmission to occur after $t_0+L$.

Figure 5A:
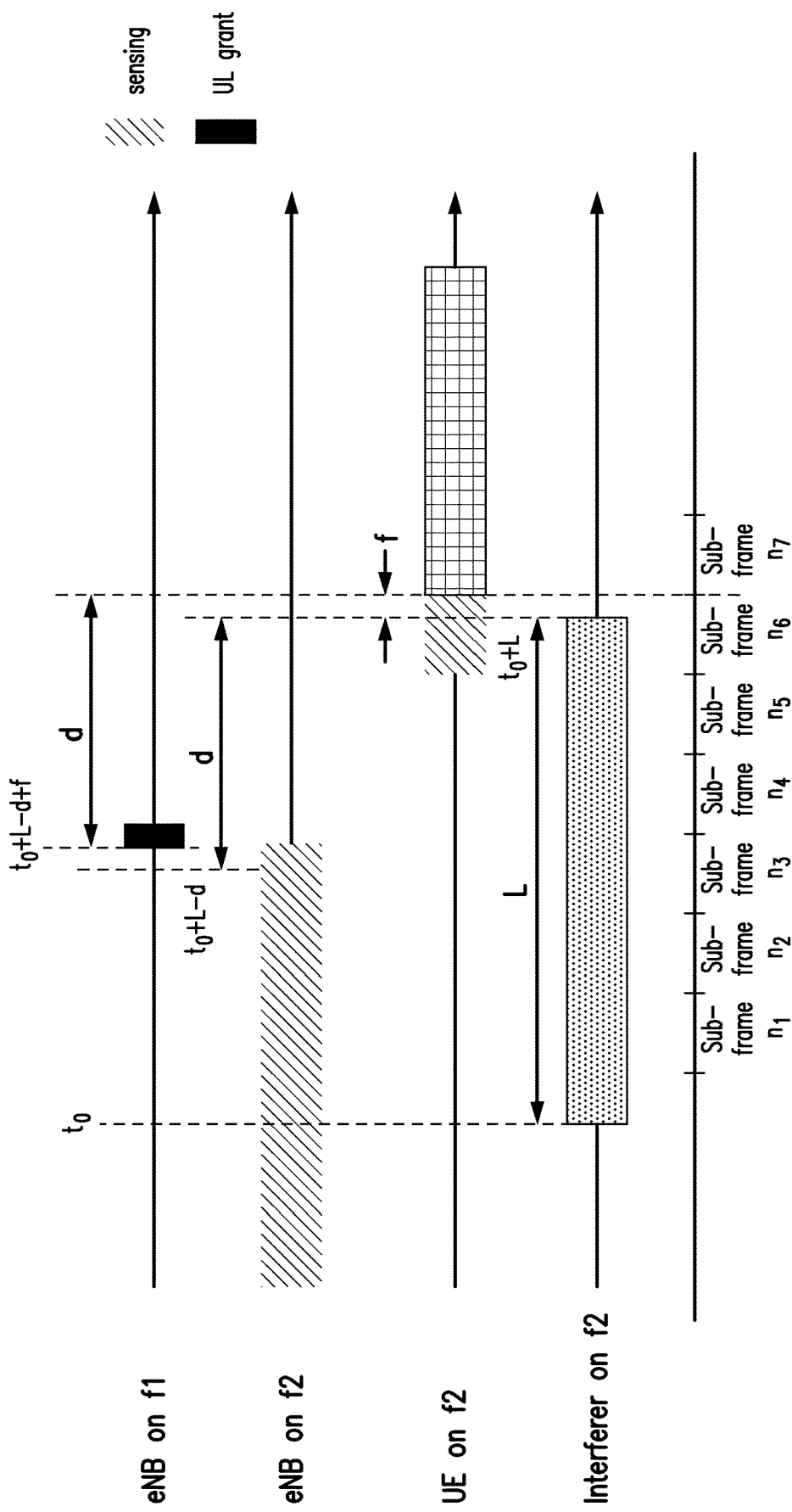
FIGS. 5A-B illustrate the configuring of the timing at which an UL grant message is transmitted.
Figure 5B:
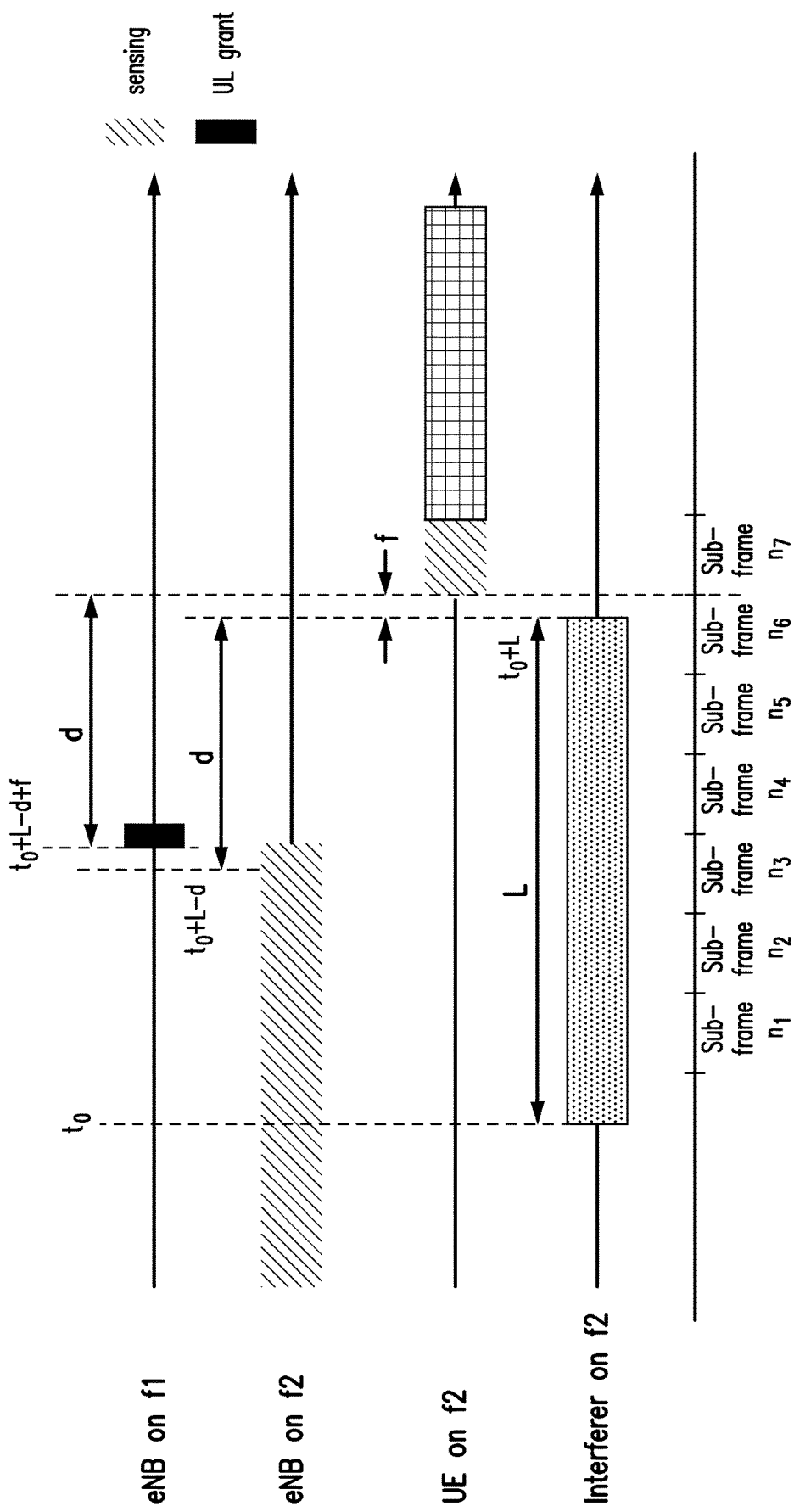

FIGS. 5A and 5B illustrate examples in which the base station configures the timing at which the UL grant message is transmitted to a WCD. As shown in FIG. 5A, the interfering signal on carrier c2 is estimated to stop at $t_0+L$. The base station may wait to transmit the UL grant message on or after $t_0+L$, but this may be too conservative, because a WCD may already wait a predetermined delay period d (e.g., 4 milliseconds) before attempting to make a UL transmission. Thus, the base station may time the transmission of its UL grant message on or after $t_0+L-d$, so that the WCD, after the delay period d, begins its UL transmission at about the same time the interfering signal is estimated to stop. Note that if $t_0+L$ is not at a time boundary between sub-frames, and there is a fractional period f that remains before the next sub-frame begins (e.g., sub-frame $n_7$) the WCD may wait until that sub-frame begins, and the UL transmission process may not begin at exactly $t_0+L$. In some instances, if the value of f is known to the base station, it may time the transmission of the UL grant message on or after $t_0+L-d+f$.

In FIG. 5A, the delay period d may exclude time that a WCD spends performing a LBT procedure or other collision avoidance procedure. As shown in FIG. 5A, the WCD may begin performing a LBT sensing operation in a subframe (e.g., subframe $n_6$) before $t_0+L$. If the amount of time for performing the LBT operation is known to be c, the WCD may begin the LBT operation at $t_0+L-c$ or $t_0+L-c+f$. Alternatively, as shown in FIG. 5B, the WCD may begin performing a LBT sensing operation in the subframe (e.g., subframe n7) at or after $t_0+L$. Thus, in this example, d may be a delay period between transmission of the UL grant message and beginning of a LBT operation which immediately precedes UL transmission. If the LBT sensing operation finishes during subframe $n_7$ and is successful, the WCD can start the UL transmission process during subframe $n_7$. In such a scenario, the WCD may begin the LBT operation at $t_0+L$ or $t_0+L+f$.

In one example, the base station may determine what UL transmission parameter values to include in the UL grant message, and/or timing of when the UL grant message is transmitted, based on a detected interfering signal. For instance, the base station may determine the UL transmission parameter values and/or timing of when to transmit the UL grant message based on how a power level of the interfering signal compares with one or more thresholds. In the example, the base station may use a plurality of thresholds (e.g., $I_0$, $I_1$). Using multiple thresholds may provide more granularity in assessing channel interference on a carrier. For instance, the base station may determine that a UL transmission may coexist with an interfering signal on carrier c2 if a power level of the interfering signal is less than a first threshold $I_0$ (e.g., a threshold of 20 dB above a predetermined minimum receiver sensitivity of the base station or of the WCD). In such instances, the UL grant message may be transmitted as early as desired, but may instruct the WCD to use UL transmission parameter values that can cope with the interference. For instance, if the power level of the interfering signal is above a second threshold $I_1$ (e.g., 10 dB above a predetermined minimum receiver sensitivity) and less than the first threshold $I_0$, the base station may select a first UL modulation and coding scheme for the WCD, a first UL transmission power for the WCD, and/or any other UL transmission parameter value that the base station considers robust for this interference range. Other examples of UL transmission parameters include a rank of multi-antenna transmissions, coefficients for multi-antenna transmissions, and LBT parameter values.

If the power level of the interfering signal is less than $I_1$, the base station may select a second UL modulation and coding scheme for the WCD, a second UL transmission power for the WCD, and/or any other UL transmission parameter value, which may be less robust compared to the first set of parameter values, but which may provide better throughput or energy efficiency.

If the power level of the interfering signal is greater than $I_0$, the base station may decide that interference is too great and it needs to delay transmission of the UL grant message, such as to a time on or after $t_0+L-d$ (as described above). Alternatively, it may transmit the UL grant message at an earlier time with a third set of UL transmission parameter values that it considers even more robust against interference.

Figure 6:
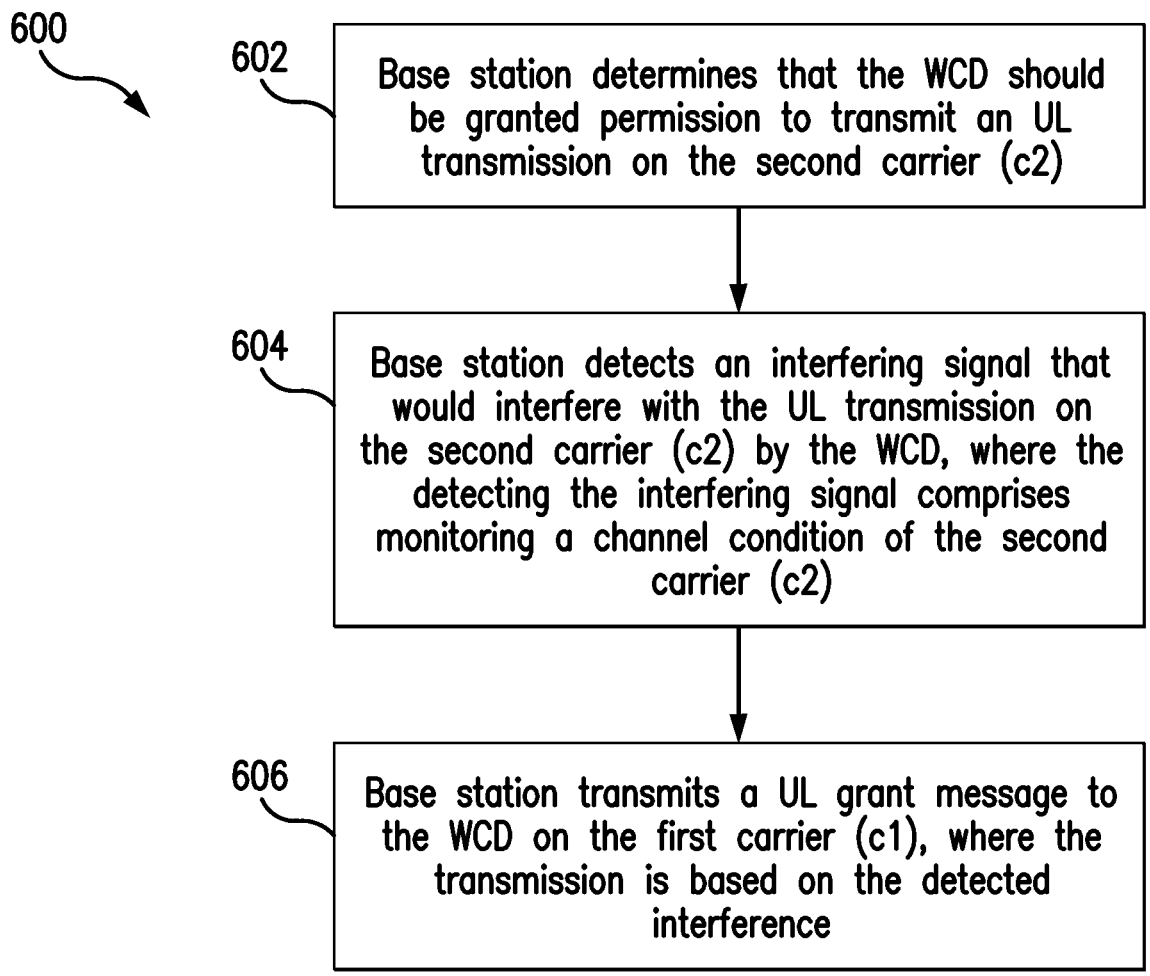
FIGS. 6-9 illustrate example steps of a method of scheduling an UL transmission from a WCD.

FIG. 6 illustrates a flow diagram which shows steps of an example method 600 performed by a base station (e.g., base station 110) for scheduling an uplink (UL) transmission from a WCD (e.g., WCD 132), where the base station and the WCD are operable to communicate using a first carrier (c1) (e.g., a carrier accessed through grants) at a first frequency (f1) and a second carrier (c2) (e.g., a carrier accessed through a contention-based scheme) at a second frequency (f2). In an embodiment, the method 600 begins at step 602, in which the base station determines that the WCD should be granted permission to transmit an UL transmission on the second carrier (c2). This determination may be based on a request from the WCD, or may be based on some other procedure.

In step 604, the base station detects at the second frequency (f2) an interfering signal that would interfere with the UL transmission on the second carrier (c2) by the WCD. In an embodiment, detecting the interfering signal comprises monitoring a channel condition of the second carrier (c2). Detection of an interfering signal is discussed in more detail later in the disclosure. In one example, the base station may monitor the channel condition over a period of time. In some instances, detecting the interfering signal is not limited to detecting an interfering signal that is beginning or has begun that would interfere with the UL transmission, but may include detecting (e.g., anticipating) that an interfering signal will begin and that would interfere with the UL transmission, such as an interfering signal which will begin and overlap with a scheduled UL transmission. In some instances, detecting the interfering signal includes detecting only an interfering signal that is beginning or has begun. The detection at the base station may be performed with or without assistance from other devices, such as the WCD, which may report a channel measurement to the base station. The interfering signal may refer to a single signal broadcasted from a single device, or may refer to an aggregate signal from the signals broadcasted by multiple devices.

In step 606, the base station transmits a UL grant message to the WCD on the first carrier (c1), where the transmission is based on the detected interference.

Figure 7:
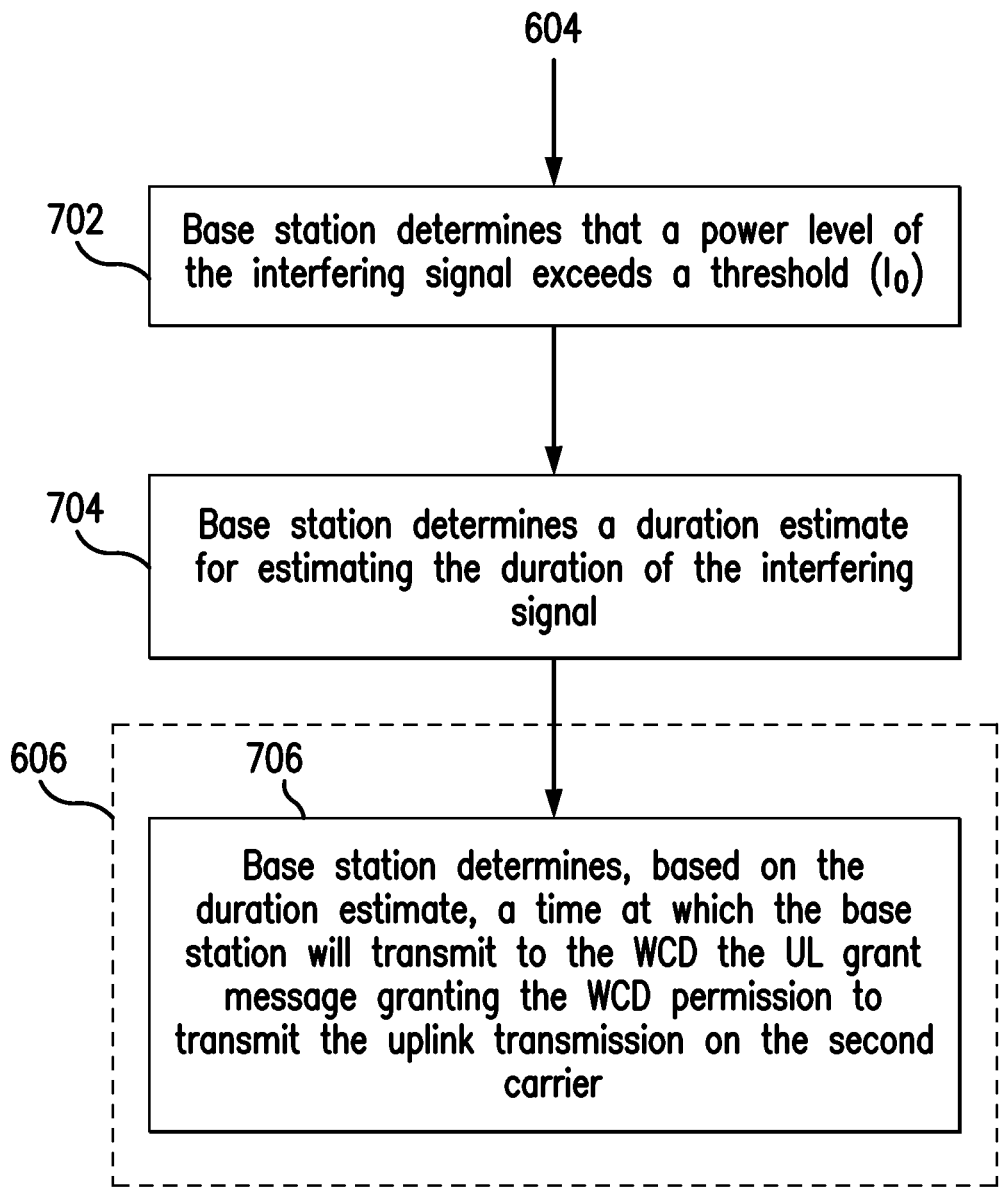

FIG. 7 illustrates additional example steps for scheduling the uplink transmission. The example steps include step 702, in which the base station determines that a power level of the interfering signal exceeds a threshold ($I_0$) (e.g., in dB or mW). For instance, $I_0$ may be a predetermined threshold used in CCA-ED to determine whether a channel is occupied, or may be another predetermined threshold value.

In step 704, the base station determines a duration estimate for estimating the duration of the interfering signal. In some instances, this step is performed only in response to the base station detecting an interfering signal. In some instances, this duration estimate may be a predicted value that is calculated before the base station detects the interfering signal. In some instances, this duration estimate may be determined only if the power level of a detected interfering signal will be Step 706 is an example of how the transmission of the UL grant message is based on the detected interference. In step 706, the base station determines, based on the duration estimate, a time at which the base station will transmit to the WCD the UL grant message granting the WCD permission to transmit the UL transmission on the second carrier.

In an embodiment, the timing of the transmission of the UL grant message is determined to cause the WCD to begin UL transmission after the estimated duration of the interfering signal. For instance, the time at which the base station will transmit the UL grant message may be determined to cause the WCD to begin UL transmission at or after $t_0+L$, wherein $t_0$ is an estimated start time of the detected interference, and L is the duration estimate of the interference. In an embodiment, the base station determines that the time at which the base station will transmit the UL grant message is equal to or later than $t_0+L-d$, wherein $t_0$ is an estimated start time of the detected interference, and L is the duration estimate of the interference, and d is a predetermined delay period (e.g., 4 ms) between transmission of the UL grant message and when the WCD can begin UL transmission.

Figure 8:
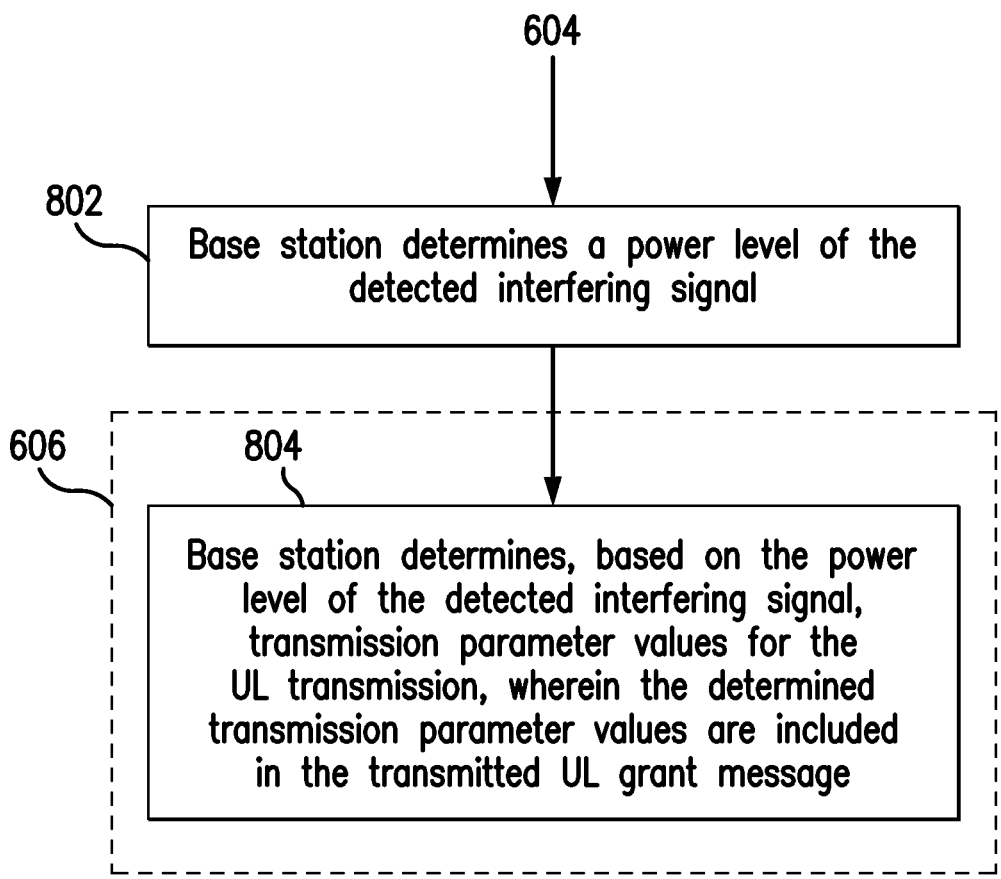

FIG. 8 illustrates another example of how the transmission of the UL grant message is based on the detected interference. The example can be combined with that described in step 706, or may be performed separately. In step 802, the base station determines a power level of the detected interfering signal. This step may be similar to step 702. In step 804, the base station determines, based on the power level of the detected interfering signal, transmission parameter values for the UL transmission, where the determined transmission parameter values are included in the transmitted UL grant message. In an embodiment, the transmission parameter values identify at least one of the following that the WCD is to use for UL transmission in the second carrier frequency channel: i) a modulation or coding scheme, ii) a transmission power level, iii) a rank of multi-antenna transmission, iv) a coefficient for multi-antenna transmissions, and v) a parameter value for the WCD to use in performing collision avoidance in the second carrier frequency channel.

Figure 9:
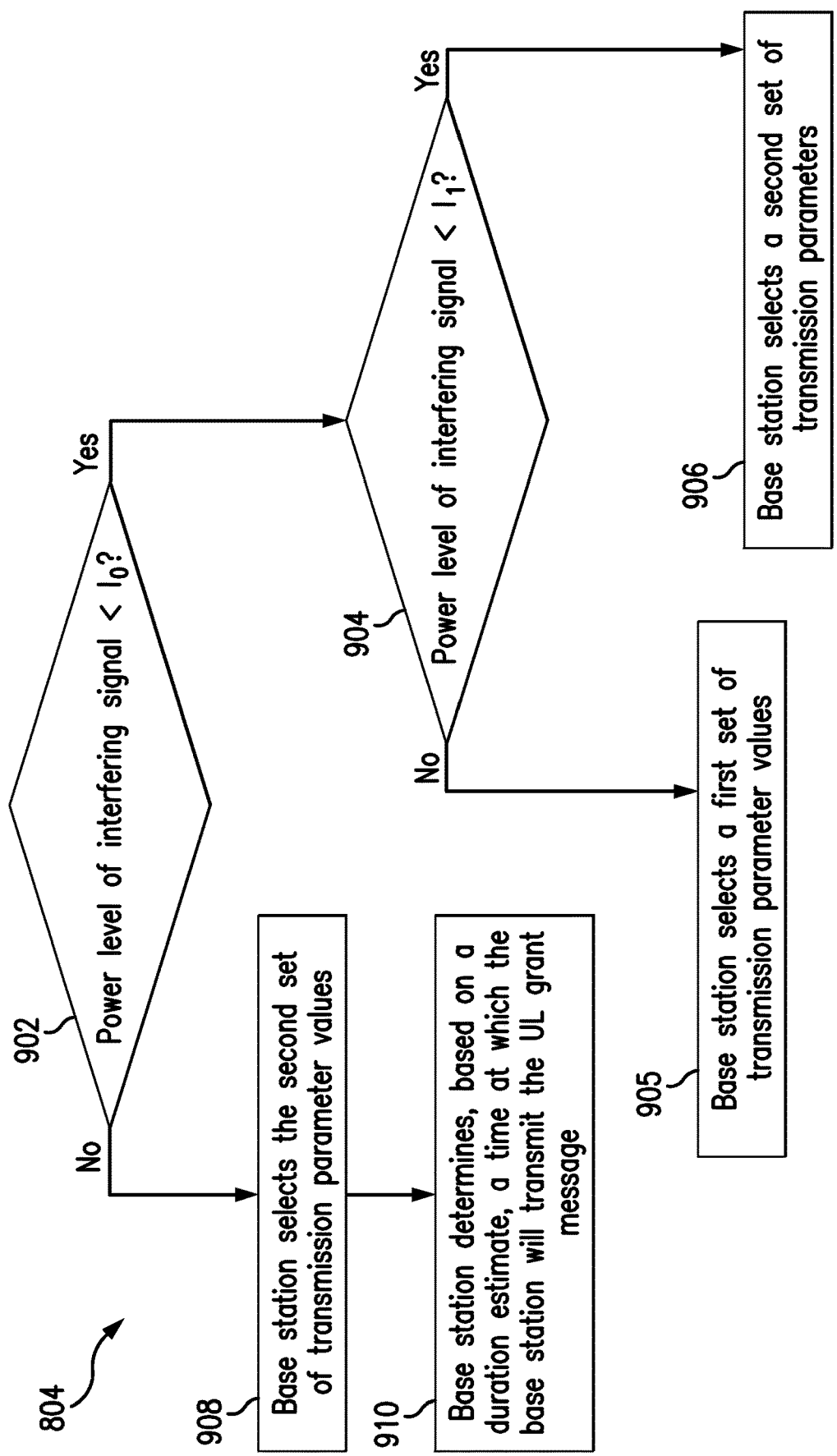

FIG. 9 illustrates example steps for determining the transmission parameter values based on the power level of the detected interfering signal. In an embodiment, the determination includes steps 902 and 904, in which a determination is made as to whether a power level of the interfering signal is greater than (or greater than or equal to) a first threshold $I_0$, whether the power level is less than (or less than or equal to) the first threshold $I_0$ and greater than (or greater than or equal to) a second threshold ($I_1$), or whether the power level is less than the second threshold $I_1$.

In step 905, in response to the base station determining that the power level of the interfering signal is less than (or less than or equal to) the first threshold ($I_0$) and greater than (or greater than or equal to) the second threshold ($I_1$), the base station selects a first set of transmission parameter values to include in the UL grant message.

In step 906, in response to the base station determining that the power level of the interfering signal is less than (or less than or equal to) the second threshold ($I_1$), the base station selects a second set of transmission parameter values to include in the UL grant message. In an embodiment, the first set of transmission parameters may be more interference-resistant compared to the second set of transmission parameter values (e.g., the first set of values may indicate a UL transmission using QPSK, while the second set of values may indicate a UL transmission using 64-QAM). In an embodiment, if the power level of the interfering signal is less than (or less than or equal to) the first threshold $I_0$, the base station may transmit the UL grant message as early as desired, which may cause the WCD to begin transmission during the estimated duration of the interfering signal.

In step 908, in response to the base station determining that the power level of the interfering signal is greater than (or greater than or equal to) the first threshold ($I_0$), the base station selects the second set of transmission parameter values and, in step 910, determines, based on a duration estimate for estimating the duration of the interfering signal, a time at which the base station will transmit to the WCD to the UL grant message, wherein the time is determined to cause the WCD to transmit to begin UL transmission after estimated duration of the interfering signal. In some instances, even if the power level of the interfering signal is greater than (or greater than or equal to) the first threshold $I_0$, the base station may select a third set of transmission parameter values that are more interference-resistant compared to the first set of transmission parameter values, and may transmit the UL grant message at a time that may cause the WCD to begin UL transmission during the estimated duration of the interfering signal.

In another embodiment, in step 908, in response to the base station determining that the power level of the interfering signal is greater than (or greater than or equal to) the first threshold ($I_0$), the base station selects a set of transmission parameter values that are less interference-resistant compared to the first set of transmission parameter values, and, in step 910, determines, based on a duration estimate for estimating the duration of the interfering signal, a time at which the base station will transmit to the WCD to the UL grant message, wherein the time is determined to cause the WCD to begin UL transmission after estimated duration of the interfering signal. In some instances, the base station may select the second set of transmission parameter values instead of a third set of transmission parameter values in this situation as well.

Interference Thresholds

The interference thresholds $I_0$ or $I_1$ can be WCD-specific. $I_0$ can be set so that the estimated minimum UL SINR over a group of WCDs reaches x dB. If UL grant messages to several WCDs are sent in the same DL subframe, $I_0$ can be set so that the estimated minimum UL SINR over the group of WCDs reaches x dB.

$I_0$ can also be set relatively to the energy detection threshold typically used to identify whether the medium is busy or not. For instance $I_0$ can be equal to the energy detection threshold, or it can be y dB lower.

$I_0$ can be adaptively changed by considering expected SINR at the base station from a WCD. The expected SINR can be estimated based on current interference level and expected received power level from the WCD. If the expected SINR is high enough for a corresponding modulation and coding rate that the WCD is using or is desired for the WCD to use, the interference threshold can be increased so that more aggressive UL grant is allowed, by adaptively changing the interference threshold based on the WCD specific information, the base station can avoid unnecessary deferral of UL grant transmission and UL data transmission and improve UL performance. Thus, in an embodiment, the base station adjusts at least one of the first threshold ($I_0$) and second threshold ($I_1$) based on an estimated signal to noise ratio (SINR) for the UL transmission, where the estimated SINR is estimated based on a current interference level in the second carrier (c2) and a power level that the WCD is expected to use for the UL transmission. The base station may increase at least one of the first threshold ($I_0$) and second threshold ($I_1$) in response to determining that the expected SINR supports a modulation or coding scheme that the WCD is expected to use for the UL transmission.

Another metric to adapt $I_0$ can be the probability that HARQ feedback is ACK. If the ACK probability exceeds a threshold Pr_ack, $I_0$ is increased. If common interference threshold at the base station is used for a group of users, similar adapative rules can be applied. Average received power level or ACK probability from the group of users can be used to decrease or increased the common interference threshold.

Determining the Duration Estimate for Estimating the Duration of the Interfering Signal Example techniques for determining the duration estimate for estimating the duration of the interfering signal are presented below:

A. Centralized Scheduling

For a distributed base station architecture, the base station may use a central scheduling unit (e.g., at base station controller 203) and several licensed assisted access (LAA) transmitters placed at different locations (e.g., transceivers 201 and 205). In some situations, two LAA transmitters may interfere with each other (e.g., transceiver 205 may send a DL signal on carrier c2, which may interfere with UL transmission at transceiver 201). In these situations, however, the central unit (e.g., base station controller 203) performs the scheduling for each LAA RRH (e.g., the scheduling of the DL signal). Thus, the central unit is aware of the transmission-related parameters of all controlled RRHs, and can obtain the duration of a scheduled transmission of an interferer within the group of the controlled LAA RRHs.

B. Information Exchange Over X2 Interface

As discussed above, a transmitter at one base station (e.g., base station 120) may cause interference with UL transmission at another base station (e.g., base station 110). The base stations may share scheduling information with each other to determine when the other base station is expected to transmit on the carrier c2.

To share information between base stations (e.g., LAA eNBs), some extra coordination may be required. Using X2 interface between base stations, the base stations can inform each other about the start time of a future UL or DL transmission and the time when the channel for carrier c2 is released again. Alternatively, to induce less frequent information flow over X2, a UL/DL pattern can be exchanged between base stations over X2. This pattern may describe which of a time and/or duration of the most recent UL activity and DL activity at a base station. The UL/DL pattern is likely to be stable over dozens of milliseconds and enables to identify the end time of an UL or DL burst, which also indicates the release of the channel.

C. Initial Signal

A node (e.g., a LAA node, such as a base station) may transmit an initial signal prior to data transmission. This initial signal may have different purposes, such as reserving the channel until subframe boundary or inform other base stations about some transmission parameters. This initial signal can thus also include information about the transmission duration. After decoding the initial signal, LAA nodes would be aware of the duration of an interfering signal.

D. WiFi Transmission Length Detection

If LAA nodes (e.g., base stations) are able to decode IEEE 802.11 signals, the duration of a IEEE 802.11 transmission can be obtained from the MAC frame header that contains a duration field. If a IEEE 802.11 system is using the request to send/clear to send (RTS/CTS) protocol, LAA nodes able to decode RTS signals can obtain the requested transmission duration.

E. Estimation Based on Past Observations

While doing continuous sensing of the carrier c2, the LAA node (e.g., base station) could extract statistics from the observed interference pattern. The duration over which a power level of the interference is constant can be stored to draw statistics such as the mean and variance of transmission duration from interfering devices. The estimation can be based on one or more of the following: i) the average past measured durations over a period observation time, ii) the maximum of past measured durations over a period observation time, iii) the median value of the past measured durations over a period observation time, and iv) a tracking loop of past measured durations. In one example, a new estimate L is computed as $\alpha \times L + (1-\alpha) \times \delta$, where $\delta$ is the duration of the latest identified interfering signal and $\alpha$ is a parameter for the tracking loop. A nonlimiting example of $\alpha$ is 0.95.

F. Maximum Channel Occupancy Duration

The regulation of certain countries specifies so-called maximum channel occupancy duration to limit continuous channel occupancy by transmitters in an unlicensed carrier band. This information can be used when estimating the duration of the interferer's transmission. For example, the base station could assume that an interferer will always transmit as much as allowed, and thus the estimated duration is equal to the maximum channel occupancy duration.

Advantages of the Embodiments of the Present Disclosure

Advantages that the present disclosure may provide include the following: 1) The UL transmission is scheduled at a time where interference level can be handled by the base station; 2) UL transmission parameters are optimized to match the measured interference level; and 3) Planned or scheduled UL subframes are not wasted (e.g., in case UE can sense the interferer and has to abort the UL transmission).

More specifically, consider a system where the scheduling node (e.g., base station) operates on a licensed and an unlicensed carrier. Because of regulations, a transmitter (e.g., an IEEE 802.11 router) on the unlicensed carrier may not be allowed to transmit continuously until its buffer is empty. Therefore, if this transmitter is an interferer towards the considered scheduling node, the interference it will cause will stop after a certain duration. This means that for a scheduling node measuring interference on the unlicensed band, it is worth delaying the UL transmission to a time when a lower level of interference is measured and/or expected. First, this may ensure that the measured interference will not prevent the WCD from carrying out the UL data transmission due to a potential UL LBT procedure. Second, this may ensure a higher UL SINR at the scheduling node.

Exemplary Base Station (e.g., eNB)

Figure 10:
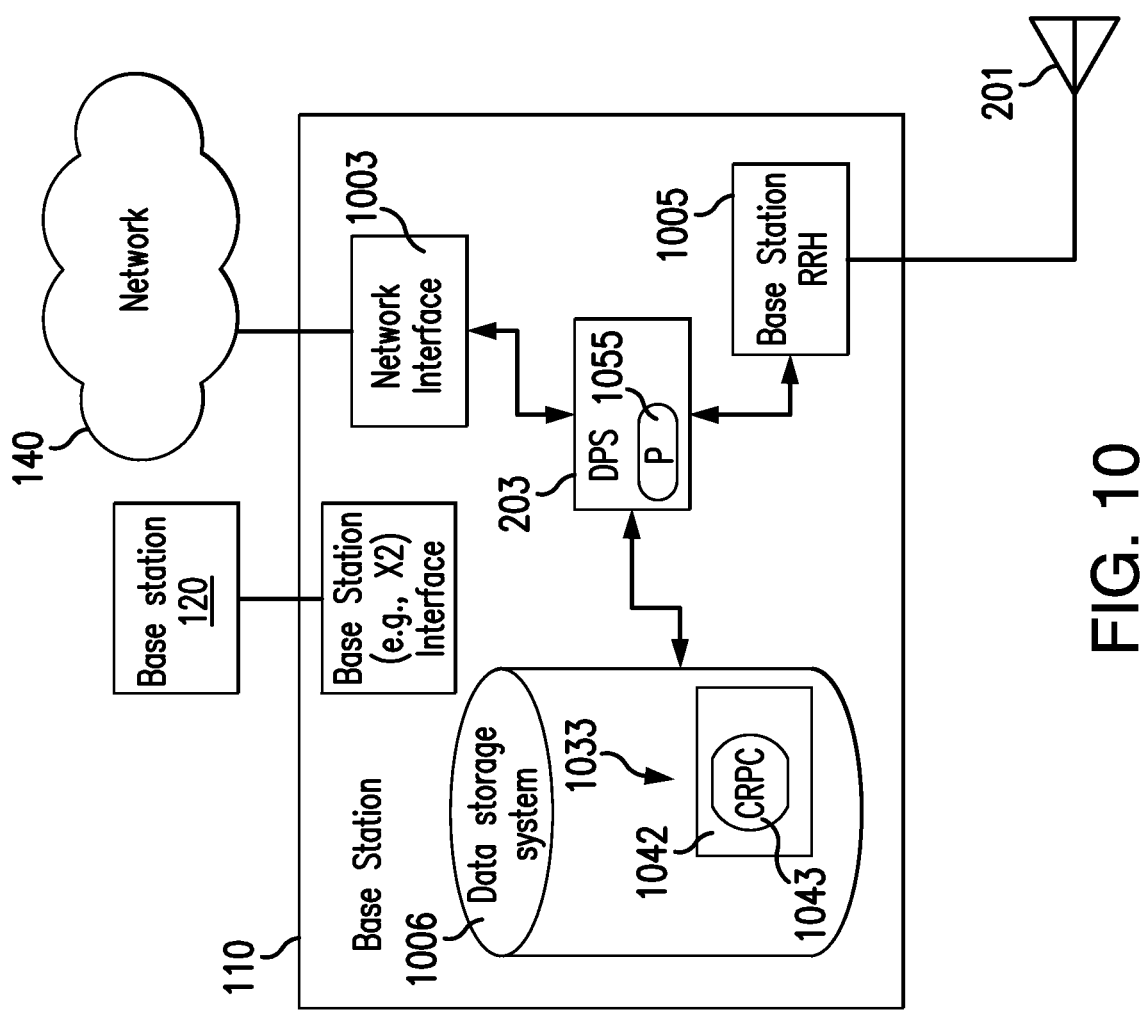
FIG. 10 illustrates an example base station, according to aspects of the present disclosure.

FIG. 10 illustrates a block diagram of a base station 110 and base station controller 203 according to some embodiments. As shown in FIG. 10, base station 110 may include: a controller 203 that takes the form of a data processing system 1055, which may include one or more processors (e.g., microprocessors and/or one or more circuits, such as an application specific integrated circuit (ASIC), Field-programmable gate arrays (FPGAs), etc.); a transceiver 201 having an antenna for receiving message from, and transmitting messages to, another apparatus such as the WCD; a data storage system 1006, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). The transceiver 201 may include a base station remote radio head (RRH). The base station controller 203 and transceiver 201 may be located at the same facility or site, or may be remote from each other (e.g., connected to a fiber optic line). In embodiments where data processing system 1055 includes a processor (e.g., a microprocessor), a computer program product 1033 may be provided, which computer program product includes: computer readable program code 1043 (e.g., instructions), which implements a computer program, stored on a computer readable medium 1042 of data storage system 1006, such as, but not limited, to magnetic media (e.g., a hard disk), optical media (e.g., a DVD), memory devices (e.g., random access memory), etc. In some embodiments, computer readable program code 1043 is configured such that, when executed by data processing system 1055, code 1043 causes the data processing system 1002 to perform steps described herein (e.g., steps shown in FIGS. 6-9). In some embodiments, controller 203 may be configured to perform steps described above without the need for code 1043. For example, data processing system 1002 may consist merely of specialized hardware, such as one or more application-specific integrated circuits (ASICs). Hence, the features of the present invention described above may be implemented in hardware and/or software. In an embodiment, the base station 110 may further include a network interface 1003 for communicating with a core network. In a UMTS system, the controller may be located in the core network. In an embodiment, the base station 110 includes a X2 interface for communicating with the base station 120.

Figure 14:
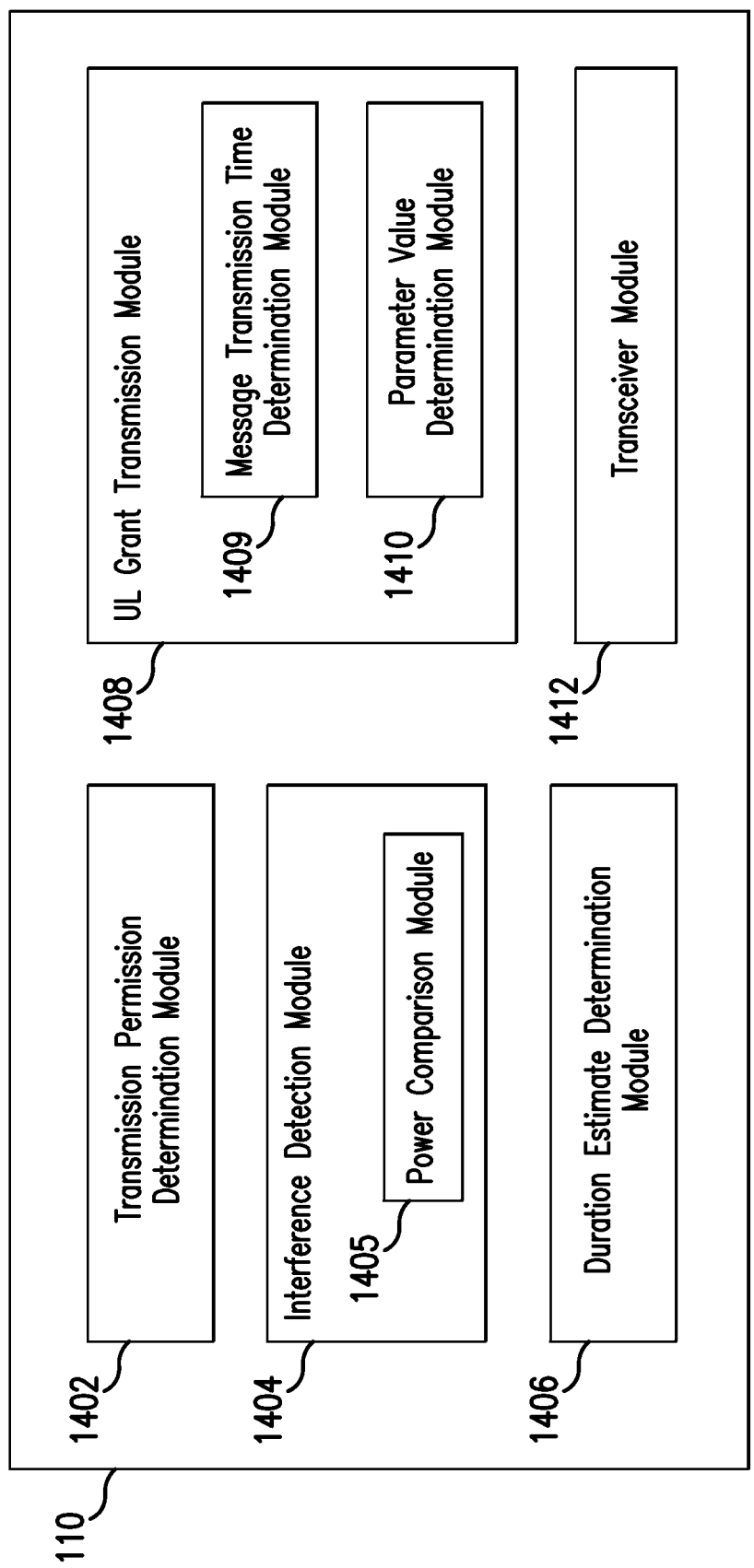
FIG. 14 illustrates example modules of a base station, according to aspects of the present disclosure.

Further, FIG. 14 illustrates example modules on base station 110. In an embodiment, one or more of the modules may be implemented by a processor executing instructions stored on a non-transitory computer readable medium (e.g., a memory), which may be located at the base station. In an embodiment, one or more of the modules may be implemented in a special-purpose or customized processor (e.g., an ASIC).

The one or more modules may include a transmission permission determination module 1402, an interference detection module 1404 (which may include a power comparison module 1405), a duration estimate determination module 1406, a UL grant transmission module 1408 (which may include a message transmission time determination module 1409 and parameter value determination module 1410), and a transceiver module 1412. They may perform, e.g., one or more of the steps shown in FIGS. 6-9.

The transceiver module 1412 is for communicating with WCDs using a first carrier (c1) at a first frequency (f1) and a second carrier (c2) at a second frequency (f2).

The transmission permission determination module 1402 is for determining that the WCD should be granted permission to transmit an UL transmission on the second carrier (c2).

The interference detection module 1404 is for detecting an interfering signal that would interfere with the UL transmission on the second carrier (c2) by the WCD, by monitoring a channel condition of the second carrier (c2).

The UL grant transmission module 1408 is for, in response to detecting the interfering signal, transmitting a UL grant message to the WCD on the first carrier (c1), where the transmission is based on the detected interference.

The duration estimate determination module 1406 is for determining a duration estimate for estimating the duration of the interfering signal.

The message transmission time determination module 1409 is for determining, based on the duration estimate, a time at which the base station will transmit to the WCD the UL grant message granting the WCD permission to transmit the uplink transmission on the second carrier. In an embodiment, the message transmission time determination module 1409 is configured to determine the time at which the base station will transmit the UL grant message by determining a time that will cause the WCD to begin UL transmission after the estimated duration of the interfering signal. In an embodiment, the message transmission time determination module 1409 is configured to determine the time at which the base station will transmit the UL grant message comprises by determining a time that will cause the WCD to begin UL transmission at or after $t_0+L$, wherein $t_0$ is an estimated start time of the detected interference, and L is the duration estimate of the interference. In an embodiment, the time at which the base station will transmit the UL grant message is determined to be equal to or later than $t_0+L-d$, wherein $t_0$ is an estimated start time of the detected interference, and L is the duration estimate of the interference, and d is a predetermined delay period between transmission of the UL grant message and when the WCD can begin UL transmission.

The power comparison module 1405 is for determining whether a power level of the interfering signal exceeds a threshold ($I_0$). In an embodiment, the duration estimate determination module 1409 determines the duration estimate for the interfering signal only if the power level of the interfering signal exceeds the threshold ($I_0$). In an embodiment, the duration estimate is determined before the base station detects the interfering signal. In an embodiment, the power comparison module 1405 is for determining a power level of the detected interfering signal.

The parameter value determination module 1410 is for determining, based on the power level of the detected interfering signal, transmission parameter values for the UL transmission, wherein the determined transmission parameter values are included in the transmitted UL grant message. In an embodiment, the parameter value determination module 1410 is for determining the transmission parameter values based on the power level of the detected interfering signal by: i) in response to the base station determining that the power level of the interfering signal is less than the first threshold ($I_0$) and greater than a second threshold ($I_1$), selecting a first set of transmission parameter values to include in the UL grant message; ii) in response to the base station determining that the power level of the interfering signal is less than the second threshold ($I_1$), selecting a second set of transmission parameter values to include in the UL grant message; iii) in response to the base station determining that the power level of the interfering signal is greater than a first threshold ($I_0$): a) selecting the second set of transmission parameter values, and b) determining, based on a duration estimate for estimating the duration of the interfering signal, a time at which the base station will transmit to the WCD the UL grant message, wherein the time is determined to cause the WCD to transmit to begin UL transmission after the estimated duration of the interfering signal. In an embodiment, the first set of transmission parameter values causes UL transmission to be more interference-resistant compared to the second set of transmission parameter values.

In an embodiment, the message transmission time determination module 1409 is configured to: in response to the base station determining that the power level of the interfering signal is less than the first threshold ($I_0$), transmit the UL grant message at a time that causes the WCD to begin UL transmission during the estimated duration of the interfering signal. In an embodiment, the first threshold ($I_0$) is equal to a threshold used by the WCD for clear channel assessment energy detection (CCA-ED).

In an embodiment, the interference detection module 1404 is configured to adjust at least one of the first threshold ($I_0$) and second threshold ($I_1$) based on an estimated signal to noise ratio (SINR) for the UL transmission, wherein the estimated SINR is estimated based on a current interference level in the second carrier (c2) and a power level that the WCD is expected to use for the UL transmission. In an embodiment, the interference detection module 1404 is configured to increase at least one of the first threshold ($I_0$) and second threshold ($I_1$) in response to determining that the expected SINR supports a modulation or coding scheme that the WCD is expected to use for the UL transmission.

Exemplary Wireless Communication Device (WCD)

Figure 11:
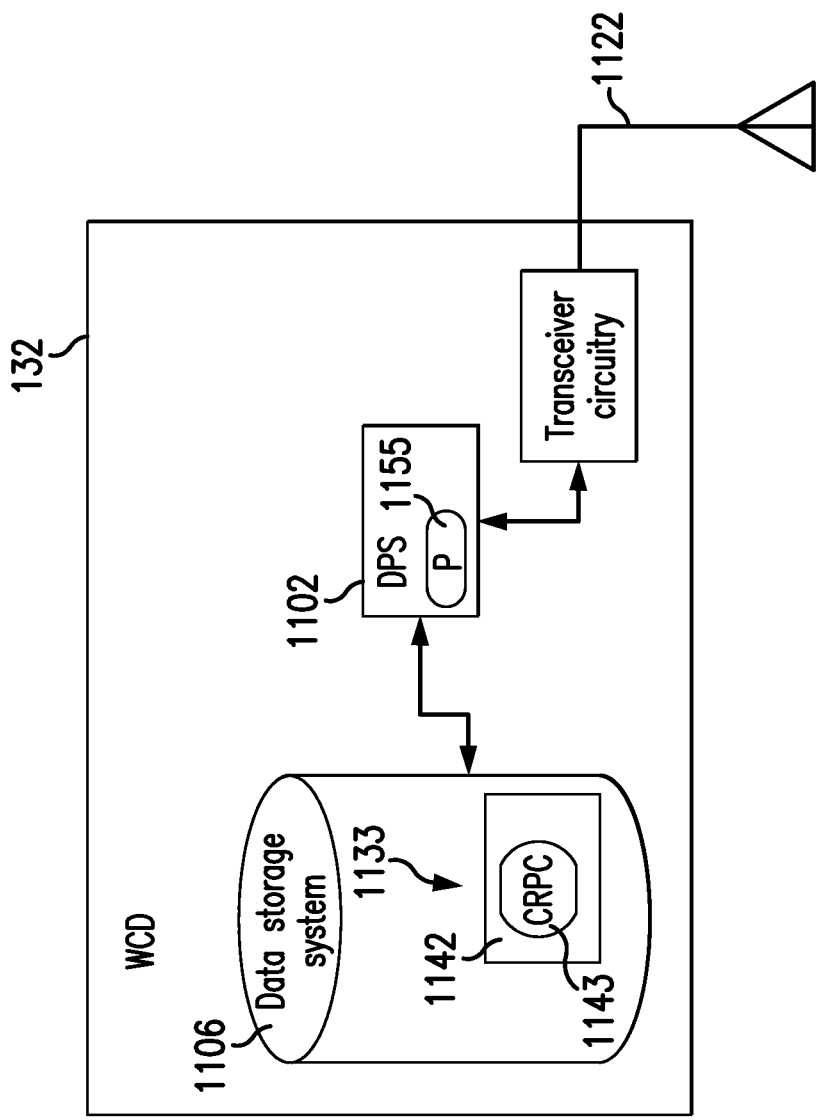
FIG. 11 illustrates an example WCD, according to aspects of the present disclosure.

FIG. 11 illustrates a block diagram of an example of the WCD 132. As shown in FIG. 11, WCD 132 may include: the data processing system (DPS) 1102 (which includes, e.g., a digital signal processor (DSP), which may include one or more processors (P) 1155 (e.g., microprocessors and/or one or more circuits, such as an application specific integrated circuit (ASIC), Field-programmable gate arrays (FPGAs), etc.); a transceiver 1122 connected to an antenna, for wirelessly transmitting and receiving information, respectively; a data storage system 1106, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1102 includes a processor 1155 (e.g., a microprocessor), a computer program product 1133 may be provided, which computer program product includes: computer readable program code 1143 (e.g., instructions), which implements a computer program, stored on a computer readable medium 1142 of data storage system 1106, such as, but not limited, to magnetic media (e.g., a hard disk), optical media (e.g., a DVD), memory devices (e.g., random access memory), etc. In some embodiments, computer readable program code 1143 is configured such that, when executed by data processing system 1102, code 1143 causes the data processing system 1102.

In some embodiments, WCD 132 is configured to perform steps described above without the need for code 1143. For example, data processing system 1102 may consist merely of specialized hardware, such as one or more application-specific integrated circuits (ASICs). Hence, the features of the present invention described above may be implemented in hardware and/or software. For example, in some embodiments, the functional components of WCD 132 described above may be implemented by data processing system 1102 executing program code 1143, by data processing system 1101 operating independent of any computer program code 1143, or by any suitable combination of hardware and/or software. In a second embodiment, WCD 1132 further includes: 1) a display screen coupled to the data processing system 1102 that enables the data processing system 1102 to display information to a user of WCD 132; 2) a speaker coupled to the data processing system 1302 that enables the data processing system 1102 to output audio to the user of WCD 132; and 3) a microphone coupled to the data processing system 1102 that enables the data processing system 1102 to receive audio from the user.

Scheduling on a Licensed Carrier in LTE

LTE uses OFDM in the downlink and DFT-spread OFDM (also referred to as single-carrier FDMA) in the uplink. The basic LTE downlink physical resource can thus be seen as a time-frequency grid, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

From LTE Rel-11 onwards, above described resource assignments can also be scheduled on the enhanced Physical Downlink Control Channel (EPDCCH). For Rel-8 to Rel-10 only Physical Downlink Control Channel (PDCCH) is available.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling. The mapping from (E)PDCCH to PDSCH is also configured semi-statically.

Communication on an Unlicensed Carrier for a Wireless Local Area Network

Figure 12:
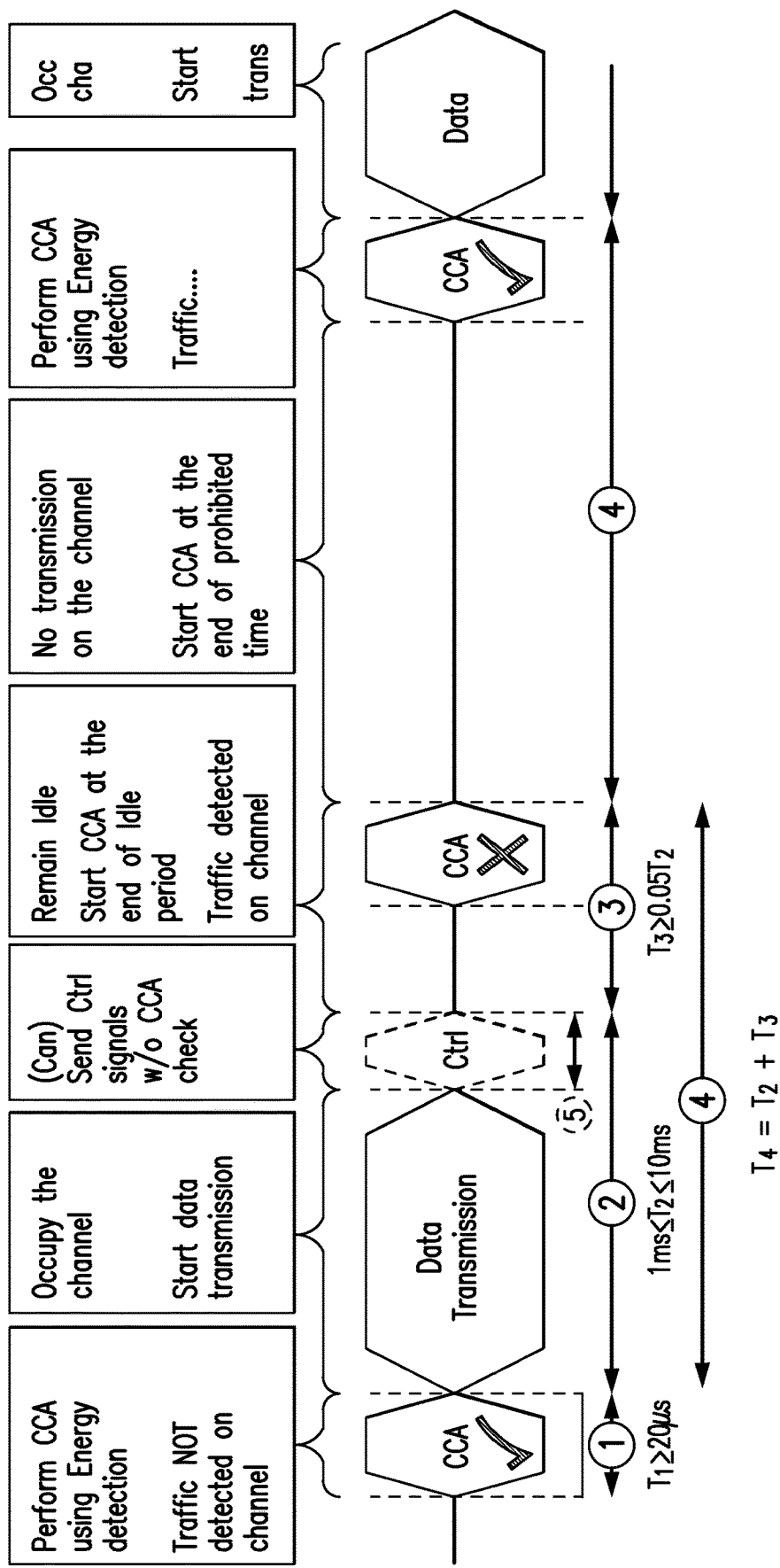
FIG. 12 illustrates example Listen Before Talk (LBT) operations

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 12.

Licensed Assisted Access (LAA) to Unlicensed Spectrum using LTE

Up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

With Licensed-Assisted Access to unlicensed spectrum a UE is connected to a PCell in the licensed band and one or more SCells in the unlicensed band. In this application we denote a secondary cell in unlicensed spectrum as LAA secondary cell (LAA SCell). The LAA SCell may operate in DL-only mode or operate with both UL and DL traffic. Furthermore, in future scenarios the LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as IEEE 802.11 (Wi-Fi).

Figure 13:
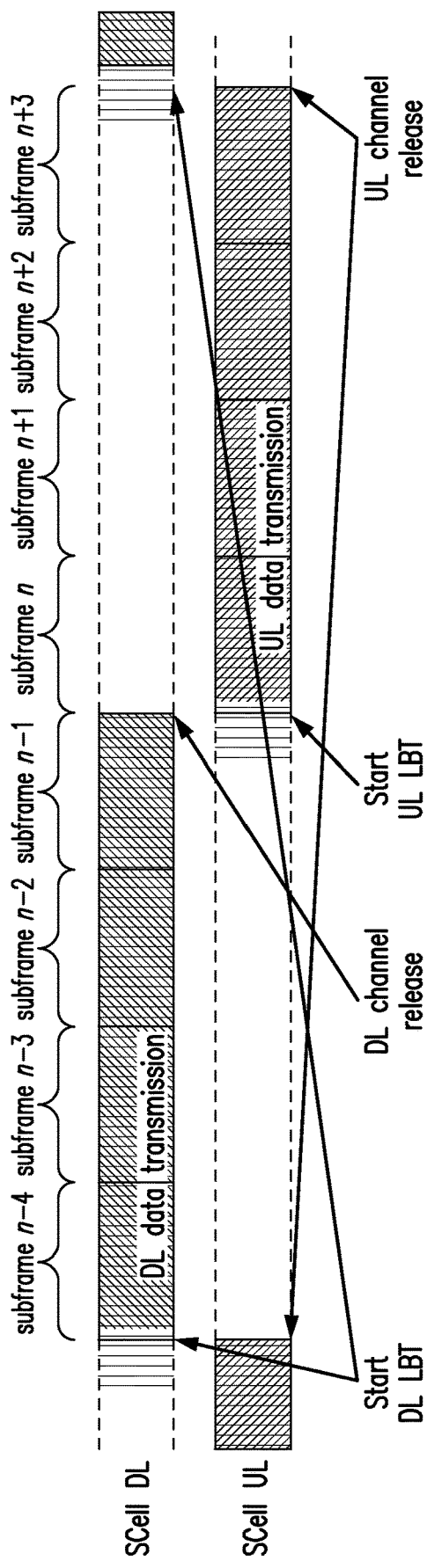
FIG. 13 illustrates LAA to unlicensed spectrum using LTE carrier aggregation and listen-before-talk to ensure good coexistence with other unlicensed band technologies.

To coexist fairly with the Wi-Fi system, transmission on the SCell shall conform to LBT protocols in order to avoid collisions and causing severe interference to on-going transmissions. This includes both performing LBT before commencing transmissions, and limiting the maximum duration of a single transmission burst. A single transmission burst refers to a transmission by a node performed after a successful channel contention. The maximum transmission burst duration is specified by country and region-specific regulations, for e.g., 4 ms in Japan and 13 ms according to EN 301.893. An example in the context of LAA is shown in FIG. 13 where DL and UL transmission is multiplexed in a time domain. Before transmission at each transmission direction, LBT is used to determine whether or not the channel is busy.

Summary of Some of the Above Described Embodiments

In one aspect a method performed by a base station for scheduling an uplink (UL) transmission from a wireless communication device (WCD) is provided. The base station and the WCD are operable to communicate using a first carrier (c1) at a first frequency (f1) and second carrier (c2) at a second frequency (f2). In one embodiment the method comprises: i) the base station determining that the WCD should be granted permission to transmit an UL transmission on the second carrier (c2); ii) the base station detecting at the second frequency (f2) an interfering signal that would interfere with the UL transmission on the second carrier (c2) by the WCD, wherein the detecting the interfering signal comprises monitoring a channel condition of the second carrier (c2); and iii) in response to detecting the interfering signal, the base station transmits a UL grant message to the WCD on the first carrier (c1), where the transmission is based on the detected interference.

The method may further comprise: i) the base station determining a duration estimate for estimating the duration of the interfering signal; and ii) the base station determining, based on the duration estimate, a time at which the base station will transmit to the WCD the UL grant message granting the WCD permission to transmit the uplink transmission on the second carrier. The determination of the duration estimate may be in response to detecting the interfering signal, or may be independent of detecting the interfering signal. The step of determining the time at which the base station will transmit the UL grant message may comprise determining a time that will cause the WCD to begin UL transmission after the estimated duration of the interfering signal.

Further, the step of determining the time at which the base station will transmit the UL grant message may comprise determining a time that will cause the WCD to begin UL transmission at or after $t_0+L$, wherein $t_0$ is an estimated start time of the detected interference, and L is the duration estimate of the interference.

Further, in some embodiments the time at which the base station will transmit the UL grant message is determined to be equal to or later than $t_0+L-d$, wherein $t_0$ is an estimated start time of the detected interference, and L is the duration estimate of the interference, and d is a predetermined delay period between transmission of the UL grant message and when the WCD can begin UL transmission.

The method may further comprise: the base station determining whether a power level of the interfering signal exceeds a threshold ($I_0$), wherein the base station determines the duration estimate for the interfering signal only if the power level of the interfering signal exceeds the threshold ($I_0$). The duration estimate may be determined before the base station detects the interfering signal.

Further, the method may comprise: i) the base station determining a power level of the detected interfering signal; and ii) the base station determining, based on the power level of the detected interfering signal, transmission parameter values for the UL transmission, wherein the determined transmission parameter values are included in the transmitted UL grant message.

Further, the transmission parameter values may identify at least one of the following that the WCD is to use for UL transmission in the second carrier frequency channel: i) a modulation or coding scheme, ii) a transmission power level, iii) a rank of multi-antenna transmission, iv) a coefficient for multi-antenna transmissions, and v) a parameter value for the WCD to use in performing collision avoidance in the second carrier frequency channel.

Further, determining the transmission parameter values based on the power level of the detected interfering signal may comprise: i) in response to the base station determining that the power level of the interfering signal is less than the first threshold ($I_0$) and greater than a second threshold ($I_1$), the base station selecting a first set of transmission parameter values to include in the UL grant message; ii) in response to the base station determining that the power level of the interfering signal is less than the second threshold ($I_1$), the base station selecting a second set of transmission parameter values to include in the UL grant message; and iii) in response to the base station determining that the power level of the interfering signal is greater than a first threshold ($I_0$), the base station: a) selecting the second set of transmission parameter values, and b) determining, based on a duration estimate for estimating the duration of the interfering signal, a time at which the base station will transmit to the WCD to the UL grant message, wherein the time is determined to cause the WCD to transmit to begin UL transmission after the estimated duration of the interfering signal.

Further, the first set of transmission parameter values causes UL transmission to be more interference-resistant compared to the second set of transmission parameter values.

Further, the method may comprise, in response to the base station determining that the power level of the interfering signal is less than the first threshold ($I_0$), the base station transmitting the UL grant message at a time that causes the WCD to begin UL transmission during the estimated duration of the interfering signal.

Further, the first threshold ($I_0$) is equal to a threshold used by the WCD for clear channel assessment energy detection (CCA-ED).

Further, the method may comprise the base station adjusting at least one of the first threshold ($I_0$) and second threshold ($I_1$) based on an estimated signal to noise ratio (SINR) for the UL transmission, wherein the estimated SINR is estimated based on a current interference level in the second carrier (c2) and a power level that the WCD is expected to use for the UL transmission. Further, the method may comprise increasing at least one of the first threshold ($I_0$) and second threshold ($I_1$) in response to determining that the expected SINR supports a modulation or coding scheme that the WCD is expected to use for the UL transmission.

Further, the first carrier (c1) may be accessed through one or more grant messages from the base station, and the second carrier (c2) may be accessed through a contention-based access scheme.

In another aspect, a base station for scheduling an uplink (UL) transmission from a wireless communication device (WCD) is provided.

In one embodiment, the base station comprises a transceiver which is operable to communicate with WCDs using a first carrier (c1) at a first frequency (f1) and a second carrier (c2) at a second frequency (f2). The base station further comprises one or more processors configured to: i) determine that the WCD should be granted permission to transmit an UL transmission on the second carrier (c2); ii) detect at the second frequency (f2) an interfering signal that would interfere with the UL transmission on the second carrier (c2) by the WCD, by monitoring a channel condition of the second carrier (c2); and iii) in response to detecting the interfering signal, transmit a UL grant message to the WCD on the first carrier (c1), where the transmission is based on the detected interference.

Further, the one or more processors may be configured to: i) determine a duration estimate for estimating the duration of the interfering signal; and ii) determine, based on the duration estimate, a time at which the base station will transmit to the WCD the UL grant message granting the WCD permission to transmit the uplink transmission on the second carrier.

Further, the one or more processors may be configured to determine the time at which the base station will transmit the UL grant message by determining a time that will cause the WCD to begin UL transmission after the estimated duration of the interfering signal.

Further, the one or more processors may be configured to determine the time at which the base station will transmit the UL grant message comprises by determining a time that will cause the WCD to begin UL transmission at or after $t_0+L$, wherein $t_0$ is an estimated start time of the detected interference, and L is the duration estimate of the interference.

Further, the time at which the base station will transmit the UL grant message may be determined to be equal to or later than $t_0+L-d$, wherein $t_0$ is an estimated start time of the detected interference, and L is the duration estimate of the interference, and d is a predetermined delay period between transmission of the UL grant message and when the WCD can begin UL transmission.

Further, the one or more processors may be configured to determine whether a power level of the interfering signal exceeds a threshold ($I_0$), wherein the base station determines the duration estimate for the interfering signal only if the power level of the interfering signal exceeds the threshold ($I_0$).

Further, the duration estimate may be determined before the base station detects the interfering signal.

Further, the one or more processors may be configured to: i) determine a power level of the detected interfering signal; and ii) determine, based on the power level of the detected interfering signal, transmission parameter values for the UL transmission, wherein the determined transmission parameter values are included in the transmitted UL grant message.

Further, the transmission parameter values may identify at least one of the following that the WCD is to use for UL transmission in the second carrier frequency channel: i) a modulation or coding scheme, ii) a transmission power level, iii) a rank of multi-antenna transmission, iv) a coefficient for multi-antenna transmissions, and v) a parameter value for the WCD to use in performing collision avoidance in the second carrier frequency channel.

Further, the one or more processors may be configured to determine the transmission parameter values based on the power level of the detected interfering signal by: i) in response to the base station determining that the power level of the interfering signal is less than the first threshold ($I_0$) and greater than a second threshold ($I_1$), selecting a first set of transmission parameter values to include in the UL grant message; ii) in response to the base station determining that the power level of the interfering signal is less than the second threshold ($I_1$), selecting a second set of transmission parameter values to include in the UL grant message; iii) in response to the base station determining that the power level of the interfering signal is greater than a first threshold ($I_0$): a) selecting the second set of transmission parameter values, and b) determining, based on a duration estimate for estimating the duration of the interfering signal, a time at which the base station will transmit to the WCD to the UL grant message, wherein the time is determined to cause the WCD to transmit to begin UL transmission after the estimated duration of the interfering signal.

Further, the first set of transmission parameter values may cause UL transmission to be more interference-resistant compared to the second set of transmission parameter values.

Further, the one or more processors may be configured to: in response to the base station determining that the power level of the interfering signal is less than the first threshold ($I_0$), transmit the UL grant message at a time that causes the WCD to begin UL transmission during the estimated duration of the interfering signal.

Further, the first threshold ($I_0$) may be equal to a threshold used by the WCD for clear channel assessment energy detection (CCA-ED).

Further, the one or more processors may be configured to: adjust at least one of the first threshold ($I_0$) and second threshold ($I_1$) based on an estimated signal to noise ratio (SINR) for the UL transmission, wherein the estimated SINR is estimated based on a current interference level in the second carrier (c2) and a power level that the WCD is expected to use for the UL transmission Further, the one or more processors may be configured to increase at least one of the first threshold ($I_0$) and second threshold ($I_1$) in response to determining that the expected SINR supports a modulation or coding scheme that the WCD is expected to use for the UL transmission.

Further, the first carrier (c1) may be accessed through one or more grant messages from the base station, and wherein the second carrier (c2) may be accessed through a contention-based access scheme.

In another embodiment, the base station comprises: a transceiver module for communicating with WCDs using a first carrier (c1) at a first frequency (f1) and a second carrier (c2) at a second frequency (f2); a transmission permission determination module for determining that the WCD should be granted permission to transmit an UL transmission on the second carrier (c2); an interference detection module for detecting at the second frequency (f2) an interfering signal that would interfere with the UL transmission on the second carrier (c2) by the WCD, by monitoring a channel condition of the second carrier (c2); and a UL grant transmission module for, in response to detecting the interfering signal, transmitting a UL grant message to the WCD on the first carrier (c1), where the transmission is based on the detected interference.

Further, the base station may comprise a duration estimate determination module for determining a duration estimate for estimating the duration of the interfering signal; and the UL grant transmission module may comprise a message transmission time determination module for determining, based on the duration estimate, a time at which the base station will transmit to the WCD the UL grant message granting the WCD permission to transmit the uplink transmission on the second carrier.

Further, the message transmission time determination module may be configured to determine the time at which the base station will transmit the UL grant message by determining a time that will cause the WCD to begin UL transmission after the estimated duration of the interfering signal.

Further, the message transmission time determination module may be configured to determine the time at which the base station will transmit the UL grant message may comprise by determining a time that will cause the WCD to begin UL transmission at or after $t_0+L$, wherein $t_0$ is an estimated start time of the detected interference, and L is the duration estimate of the interference.

Further, the time at which the base station will transmit the UL grant message may be determined to be equal to or later than $t_0+L-d$, wherein $t_0$ is an estimated start time of the detected interference, and L is the duration estimate of the interference, and d is a predetermined delay period between transmission of the UL grant message and when the WCD can begin UL transmission.

Further, the interference detection module may comprise a power comparison module for determining whether a power level of the interfering signal exceeds a threshold ($I_0$), wherein the duration estimate determination module determines the duration estimate for the interfering signal only if the power level of the interfering signal exceeds the threshold ($I_0$).

Further, the duration estimate may be determined before the base station detects the interfering signal.

Further, the interference detection module may comprise a power comparison module for determining a power level of the detected interfering signal, and the UL grant transmission module may comprise a parameter value determination module for determining, based on the power level of the detected interfering signal, transmission parameter values for the UL transmission, wherein the determined transmission parameter values are included in the transmitted UL grant message.

Further, the transmission parameter values may identify at least one of the following that the WCD may use for UL transmission in the second carrier frequency channel: i) a modulation or coding scheme, ii) a transmission power level, iii) a rank of multi-antenna transmission, iv) a coefficient for multi-antenna transmissions, and v) a parameter value for the WCD to use in performing collision avoidance in the second carrier frequency channel.

Further, the UL grant transmission module may comprise a parameter value determination module for determining the transmission parameter values based on the power level of the detected interfering signal by: i) in response to the base station determining that the power level of the interfering signal is less than the first threshold ($I_0$) and greater than a second threshold ($I_1$), selecting a first set of transmission parameter values to include in the UL grant message; ii) in response to the base station determining that the power level of the interfering signal is less than the second threshold ($I_1$), selecting a second set of transmission parameter values to include in the UL grant message; iii) in response to the base station determining that the power level of the interfering signal is greater than a first threshold ($I_0$): a) selecting the second set of transmission parameter values, and b) determining, based on a duration estimate for estimating the duration of the interfering signal, a time at which the base station will transmit to the WCD to the UL grant message, wherein the time is determined to cause the WCD to transmit to begin UL transmission after the estimated duration of the interfering signal.

Further, the first set of transmission parameter values may causes UL transmission to be more interference-resistant compared to the second set of transmission parameter values.

Further, the message transmission time determination module may be configured to: in response to the base station determining that the power level of the interfering signal is less than the first threshold ($I_0$), transmit the UL grant message at a time that causes the WCD to begin UL transmission during the estimated duration of the interfering signal.

Further, the first threshold ($I_0$) may be equal to a threshold used by the WCD for clear channel assessment energy detection (CCA-ED).

Further, the interference detection module may be configured to adjust at least one of the first threshold ($I_0$) and second threshold ($I_1$) based on an estimated signal to noise ratio (SINR) for the UL transmission, wherein the estimated SINR is estimated based on a current interference level in the second carrier (c2) and a power level that the WCD is expected to use for the UL transmission.

Further, the interference detection module may be configured to increase at least one of the first threshold ($I_0$) and second threshold ($I_1$) in response to determining that the expected SINR supports a modulation or coding scheme that the WCD is expected to use for the UL transmission.

Further, the first carrier (c1) may be accessed through one or more grant messages from the base station, and the second carrier (c2) may be accessed through a contention-based access scheme.

CONCLUSION

The disclosure thus relates to optimizing UL grant transmission when cross-carrier scheduling is used. By utilizing the information of an interference level observed at an eNB and estimated interference duration, unnecessary UL grant transmission is deferred and its transmission timing is optimally adjusted.

The invention claimed is:

1. A method for scheduling an uplink (UL) transmission from a wireless communication device (WCD) wherein the WCD is operable to communicate using a first carrier at a first frequency and second carrier at a second frequency, the method comprising:
 a base station determining that the WCD should be granted permission to transmit the UL transmission on the second carrier;
 the base station detecting at the second frequency an interfering signal that would interfere with the UL transmission on the second carrier by the WCD; and
 in response to detecting the interfering signal, the base station transmitting on the first carrier an UL grant message to the WCD, wherein the transmission of the UL grant message is based on the detected interfering signal, wherein the transmission of the UL grant message based on the detected interfering signal further comprises:

the base station determining whether a power level of the interfering signal is less than a threshold, $I_0$; and
as a result of determining that the power level is not less than $I_0$, the base station further performing:
determining a duration estimate for estimating the duration of the interfering signal;
determining, based on the duration estimate, a point in time at which the base station will transmit to the WCD the UL grant message; and
transmitting the UL grant message at said determined point in time.

2. The method of claim 1, wherein the step of transmitting the UL grant message based on the detected interfering signal comprises:
the base station determining a duration estimate for estimating the duration of the interfering signal;
the base station determining, based on the duration estimate, a point in time at which the base station will transmit to the WCD the UL grant message; and
the base station transmitting the UL grant message at said determined point in time.

3. The method of claim 2, wherein determining the point in time comprises calculating one of: $(t_0+L-d)$ and $(t_0+L-d+f)$, wherein to is an estimated start time of the detected interfering signal, L is the duration estimate, d is a predetermined delay, and f is a fractional period that remains before a next sub-frame begins.

4. The method of claim 1, further comprising:
the base station determining a power level of the detected interfering signal; and the base station determining, based on the power level of the detected interfering signal, transmission parameter values for the UL transmission, wherein the determined transmission parameter values are included in the transmitted UL grant message.

5. The method of claim 4, wherein the transmission parameter values identify at least one of the following that the WCD is to use for UL transmission in the second carrier frequency channel: a modulation or coding scheme, a transmission power level, a rank of multi-antenna transmission, a coefficient for multi-antenna transmissions, and a parameter value for the WCD to use in performing collision avoidance in the second carrier frequency channel.

6. The method of claim 4, wherein determining the transmission parameter values based on the power level of the detected interfering signal comprises:
determining whether the power level of the interfering signal is less than a threshold; and further comprises one of:
the base station selecting a first set of transmission parameter values to include in the UL grant message in response to the base station determining that the power level of the interfering signal is less than the threshold; and
the base station selecting a second set of transmission parameter values to include in the UL grant message in response to the base station determining that the power level of the interfering signal is not less than the threshold.

7. The method of claim 6, further comprising the base station adjusting the threshold based on an estimated signal to noise ratio (SINR) for the UL transmission, wherein the estimated SINR is estimated based on a current interference level in the second carrier and a power level that the WCD is expected to use for the UL transmission.

8. The method of claim 7, wherein the base station increases the threshold in response to determining that the expected SINR supports a modulation or coding scheme that the WCD is expected to use for the UL transmission.

9. The method of claim 1, wherein the threshold is equal to a threshold used by the WCD for clear channel assessment energy detection (CCA-ED).

10. An apparatus for scheduling an uplink (UL) transmission from a wireless communication device (WCD), wherein the WCD is operable to communicate using a first carrier at a first frequency and second carrier at a second frequency, the apparatus comprising:
a transmitter; and
processing circuitry coupled to the transmitter, wherein the processing circuitry is adapted to:
determine that the WCD should be granted permission to transmit the UL transmission on the second carrier;
detect at the second frequency an interfering signal that would interfere with the UL transmission on the second carrier by the WCD; and
in response to detecting the interfering signal, employ the transmitter to transmit on the first carrier an UL grant message to the WCD based on the detected interfering signal by performing a process comprising:
determining whether a power level of the interfering signal is less than a threshold, $I_0$; and
performing the following steps as a result of determining that the power level is not less than $I_0$:
determining a duration estimate for estimating the duration of the interfering signal;
determining, based on the duration estimate, a point in time at which the base station will transmit to the WCD the UL grant message; and
transmitting the UL grant message at said determined point in time.

11. The apparatus of claim 10, wherein the apparatus is adapted to transmit the UL grant message based on the detected interfering signal by performing a process comprising:
determining a duration estimate for estimating the duration of the interfering signal;
determining, based on the duration estimate, a point in time at which the base station will transmit to the WCD the UL grant message; and
transmitting the UL grant message at said determined point in time.

12. The apparatus of claim 11, wherein the apparatus is adapted to determine the point in time by performing a process comprising calculating one of: $(t_0+L-d)$ and $(t_0+L-d+f)$, wherein to is an estimated start time of the detected interfering signal, L is the duration estimate, d is a predetermined delay, and f is a fractional period that remains before a next sub-frame begins.

13. The apparatus of claim 10, wherein the apparatus is further adapted to:
determine a power level of the detected interfering signal; and
determine, based on the power level of the detected interfering signal, transmission parameter values for the UL transmission, wherein the determined transmission parameter values are included in the transmitted UL grant message.

14. The apparatus of claim 13, wherein the transmission parameter values identify at least one of the following that the WCD is to use for UL transmission in the second carrier frequency channel: a modulation or coding scheme, a transmission power level, a rank of multi-antenna transmission, a coefficient for multi-antenna transmissions, and a parameter value for the WCD to use in performing collision avoidance in the second carrier frequency channel.

15. The apparatus of claim 13, wherein the apparatus is adapted to determine the transmission parameter values based on the power level of the detected interfering signal by performing a process comprising:
   determining whether the power level of the interfering signal is less than a threshold;
and further performing one of:
   selecting a first set of transmission parameter values to include in the UL grant message in response to the base station determining that the power level of the interfering signal is less than the threshold; and selecting a second set of transmission parameter values to include in the UL grant message in response to the base station determining that the power level of the interfering signal is not less than the threshold.

16. The apparatus of claim 15, wherein the apparatus is further adapted to adjust the threshold based on an estimated signal to noise ratio (SINR) for the UL transmission, wherein the estimated SINR is estimated based on a current interference level in the second carrier and a power level that the WCD is expected to use for the UL transmission.

17. The apparatus of claim 16, wherein the apparatus is adapted to increase the threshold in response to determining that the expected SINR supports a modulation or coding scheme that the WCD is expected to use for the UL transmission.

18. A computer program product comprising a non-transitory computer readable medium storing a computer program for scheduling an uplink (UL) transmission from a wireless communication device (WCD), wherein the WCD is operable to communicate using a first carrier at a first frequency and second carrier at a second frequency, the computer program comprising instructions that, when executed on at least one processor, cause the at least one processor to carry out the method of claim 1.

* * * * *